(12) United States Patent
Antonsson

(10) Patent No.: US 11,245,547 B2
(45) Date of Patent: Feb. 8, 2022

(54) MONITORING CONTROLLER AREA NETWORK (CAN) NODES

(71) Applicant: Volvo Car Corporation, Gothenburg (SE)

(72) Inventor: Anders Antonsson, Västra Frölunda (SE)

(73) Assignee: Volvo Car Corporation, Gothenburg (SE)

( * ) Notice: Subject to any disclaimer, the term of this patent is extended or adjusted under 35 U.S.C. 154(b) by 40 days.

(21) Appl. No.: 16/792,613

(22) Filed: Feb. 17, 2020

(65) Prior Publication Data
US 2020/0274731 A1     Aug. 27, 2020

(30) Foreign Application Priority Data
Feb. 22, 2019     (EP) .................................... 19158846

(51) Int. Cl.
*H04L 12/40* (2006.01)
*H04L 12/725* (2013.01)

(52) U.S. Cl.
CPC .. *H04L 12/40032* (2013.01); *H04L 12/40143* (2013.01); *H04L 45/30* (2013.01); *H04L 2012/40215* (2013.01)

(58) Field of Classification Search
CPC ......... H04L 12/40032; H04L 12/40143; H04L 2012/40215; H04L 45/30
See application file for complete search history.

(56) References Cited

U.S. PATENT DOCUMENTS

| | | | |
|---|---|---|---|
| 7,779,196 B2 * | 8/2010 | Lammers | H04L 12/4135 710/315 |
| 10,142,358 B1 * | 11/2018 | Bajpai | H04L 63/1466 |
| 10,277,385 B1 * | 4/2019 | Anandan | H04L 7/02 |
| 10,791,002 B2 * | 9/2020 | de Haas | H04L 12/40045 |
| 10,958,680 B2 * | 3/2021 | Jain | H04L 9/0838 |
| 2003/0158983 A1 * | 8/2003 | Dalakuras | H04L 63/10 710/107 |
| 2011/0103390 A1 | 5/2011 | Hall et al. | |
| 2013/0094353 A1 * | 4/2013 | Monroe | H04L 12/4135 370/225 |

(Continued)

OTHER PUBLICATIONS

Extended Search Report from counterpart European Application No. 19158846.6, dated Jul. 4, 2019, 8 pp.

(Continued)

*Primary Examiner* — Rasheed Gidado
(74) *Attorney, Agent, or Firm* — Shumaker & Sieffert, P.A.

(57) ABSTRACT

The present disclosure relates to a method of monitoring Controller Area Network (CAN) nodes and a monitoring device performing the method.
In an aspect a method of a monitoring device of monitoring a plurality of CAN buses is provided, wherein at least one CAN node is connected to each CAN bus, said plurality of CAN buses being interconnected via the monitoring device. The method comprises detecting, for each CAN bus, any dominant data being sent over said each CAN bus by a CAN node connected to said each CAN bus and routing said any dominant data received by the monitoring device over said each CAN bus to all remaining CAN buses without overwriting any dominant data sent over the remaining CAN buses.

18 Claims, 14 Drawing Sheets

(56) References Cited

U.S. PATENT DOCUMENTS

| | | | |
|---|---|---|---|
| 2015/0347258 A1* | 12/2015 | Du | G06F 11/3062 |
| | | | 714/4.2 |
| 2016/0196230 A1* | 7/2016 | Pihet | G06F 13/4027 |
| | | | 710/314 |
| 2016/0359545 A1* | 12/2016 | Kodama | H04B 7/15507 |
| 2018/0069723 A1* | 3/2018 | Beckmann | H04L 12/40169 |
| 2019/0052654 A1 | 2/2019 | Juliato et al. | |

OTHER PUBLICATIONS

"Road vehicles—Controller area network (CAN)—Part 2: High-speed medium access unit," International Standard: ISO 11898-2, Second edition, Dec. 15, 2016, 38 pp.

"Road vehicles—Local Interconnect Network (LIN)—Part 3: Protocol specification," Swedish Standards Institute; Svensk Standard: ISO 17987-3, Oct. 21, 2016, 60 pp.

"Road vehicles—Local Interconnect Network (LIN)—Part 4: Electrical physical layer (EPL) specification 12 V / 24 V," Swedish Standards Institute; Svensk Standard: ISO 17987-4, Oct. 21, 2016, 40 pp.

"TI Designs: TIDA-01487 Isolated CAN FD Repeater Reference Design," Texas Instruments, Apr. 2018, 17 pp.

"Road vehicles—Controller area network (CAN)—Part 1: Data link layer and physical signalling," International Standard: ISO 11898-1, Second edition, Dec. 15, 2015, 74 pp.

\* cited by examiner

MONITORING CONTROLLER AREA NETWORK (CAN) NODES

CROSS REFERENCE

This application claims priority to European application no. 19158846.6 filed 22 Feb. 2019, the entire contents of which are hereby incorporated by reference.

TECHNICAL FIELD

The present disclosure relates to a method of monitoring Controller Area Network (CAN) nodes and a monitoring device performing the method.

BACKGROUND

The automotive industry is using message based communication protocols between electronic control units (ECUs) embedded in motor vehicles. An example of such a protocol is Controller Area Network (CAN). This protocol is standardized by International Standards Organization (ISO). For instance, the CAN protocol used in automotive is defined by ISO standard ISO 11898, consisting of several sub specifications addressing different parts; for example the CAN datalink layer is defined by ISO 11898-1 and CAN high-speed physical layer is defined by ISO 11898-2.

An important capability in design, verification and fault tracing of CAN communication are tools that can be used to analyse all communication protocol details. In particular tools that aid analysis of communication faults and errors. However, it is not only faults that can be of importance but rather finding the origin of a certain communication event. Analysing both expected and unexpected events can provide enhanced understanding of a CAN network. It may also be used as an early warning of any potential problem that may occur later on. Gathering the information, for instance the type of event and origin, for expected and unexpected events may be based on sampling the network communication for an amount of time or in certain operational modes. From that information a risk analysis can be made which can aid in addressing or dismissing further investigation towards certain parts of a CAN network.

Conventional state of the art CAN tools provide extensive analysis capabilities, but with ever increasing complexity of vehicle electrical systems there is an increasing risk for systems not behaving as expected, hence there is need for even more detailed analysis capabilities. This is especially true due to the addition of new formats of CAN communication, e.g. the CAN Flexible Data (CAN FD) protocol. Some CAN networks are hybrids between the older Classic CAN formats and newer formats e.g. CAN FD. Such hybrid networks provide an extra challenge when it comes to ensuring their correct operation.

An important aspect of unexpected or even expected communication behaviours is to determine the root cause or origin. Having the capability to precisely determine the origin (e.g. a particular CAN ECU in a network of ECUs) of an unwanted behaviour can be especially valuable as this can reduce the total effort needed to find the root cause and make corrective actions. Another desired capability is to characterise an expected behaviour where some margin exist between actual behaviour and requirements or where requirements are loosely defined (e.g. accumulated count of error flags).

Reducing the total analysis effort usually means that time and cost for detecting an unexpected behaviour, determining the origin of it, making corrective actions, and finally verifying the problem as solved, can be significantly reduced. Reducing time for resolving problems are often critical in the automotive industry.

For CAN there are fault confinement mechanisms within the protocol and the ECUs are expected to handle those faults by themselves, according to ISO 11898-1 standard. Therefore it is important that such requirements can be verified by the OEM and suppliers, in order to reduce risk for unexpected vehicle behaviour. The fault confinement mechanisms in ISO 11898 allow an ECU to 'absorb' or tolerate communication problems to some degree while still trying to maintain communication.

The reasons for CAN faults may be hardware or software (e.g. bugs, damaged components or even system design flaws) or environmental, such as EMI disturbance. Depending on the type of fault this can have widely different impacts on the electrical system ranging from no impact at all, slower system response, and system partly going to limp home mode, full or partial loss of system functionality or system start up- or shutdown problems. Problems can also vary over time in the same vehicle making them very hard to identify, reproduce, plan and implement corrective actions and verify those actions. It can be particularly difficult to identify and associate customer perceivable symptoms with a root cause in the electrical system. There may also be symptoms not noticeable by a customer but still being important or even making the vehicle not compliant to critical requirements.

Conventional CAN analysis tools that are connected in the conventional way directly and only to CAN bus wires CAN_L and CAN_H are unable to provide some analysis capabilities. Part of the reason is the nature of the CAN data link layer and physical layer itself. Determining several aspects about each ECU in a CAN network separately from the other ECUs may provide an improved understanding of the communication properties of that ECU. Examples can be whether a specific ECU receiving frames from other ECUs acknowledges the frames, while other ECUs also acknowledges (at the same time). Other examples are arbitration, which ECUs have participated in an arbitration; which ECU won the arbitration and which other ECUs lost the arbitration. Understanding such details could provide knowledge of actual frame transmission timing and scheduling. Another example may be which ECU did or did not transmit an error flag that invalidated a CAN frame. Having access to internal signalling inside CAN ECUs that would support detailed analysis may be difficult or inconvenient for several reasons. For instance, ECUs are normally not designed for external access to internal signals, so ECUs have to be opened or modified such that internal signals can be accessed. Further, ECUs may be difficult to access due to the inconspicuous positions in which they are mounted in the vehicle.

SUMMARY

One objective of the present invention is to solve, or at least mitigate, this problem in the art and thus to provide an improved method of monitoring a plurality of CAN nodes, for instance in the form of ECUs of a motor vehicle.

This objective is attained by a monitoring device according to an embodiment. The monitoring device is configured to receive data over a plurality of CAN buses.

If dominant data bits are received by the monitoring device over any one or more of the plurality of CAN buses, the dominant data bits are routed over the remaining CAN buses at a voltage level interpreted by CAN nodes connected to the buses as being dominant, but which voltage level is configured such that the dominant data routed over the remaining buses by the monitoring device does not overwrite dominant data sent by one or more of the CAN nodes connected to the remaining buses.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
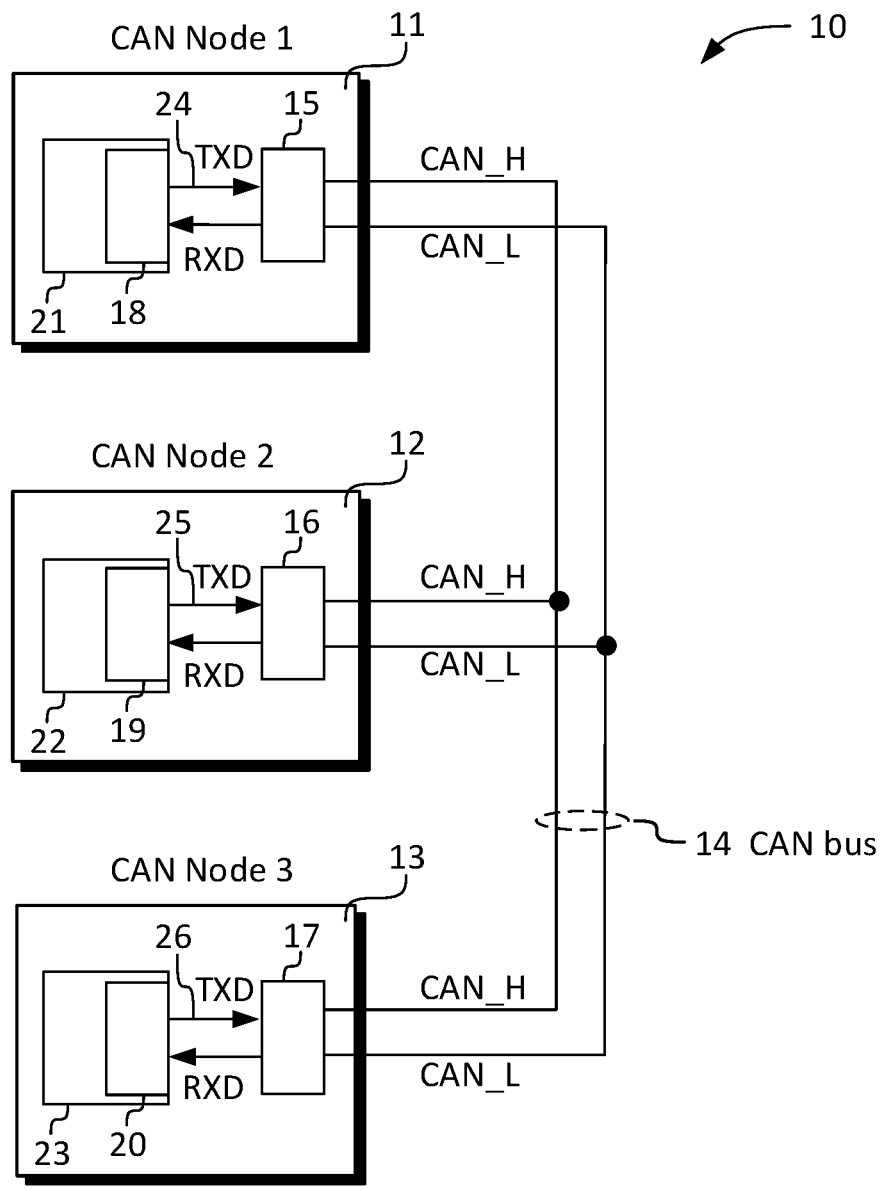
FIG. 1 illustrates a prior art CAN bus interconnecting three CAN nodes.

FIG. 1 illustrates three CAN nodes 11, 12, 13 being connected to a linear passive CAN bus 14. A CAN bus is a multi-master serial communication bus which consist of two physical wires, CAN_H and CAN_L, being connected to a respective terminal of each CAN nodes. All CAN nodes (embodied in the form of e.g. ECUs) in a CAN network 10 are connected to these two wires.

Internally, each CAN node 11, 12, 13 has a bus interface circuit; a CAN transceiver 15, 16, 17. Each CAN node also has a CAN protocol controller 18, 19, 20 which handles protocol bit stream reception and transmission on data link layer according to ISO 11898-1. A microcontroller 21, 22, 23 is connected to the respective CAN protocol controller 18, 19, 20. The CAN controllers may optionally be a part of the microcontrollers.

The CAN protocol uses a serial bit stream with values 0 and 1, or also known as dominant and recessive bits that make up CAN frames and other protocol symbols transmitted on the CAN bus 14. All CAN nodes 11, 12, 13 are capable of transmitting frames to each other. The CAN protocol controller 18, 19, 20 is handling the reception and transmission of CAN frames and error events. The transmitted bit values 0 and 1 from the CAN protocol controller are converted in the CAN transceiver 15, 16, 17 in each CAN node into two voltage levels on the CAN bus 14, which is referred to as recessive and dominant state. That is, the recessive state is caused by recessive data being sent over the bus, while the dominant state is caused by dominant data being sent over the bus. These states relate to two voltage ranges on the CAN bus 14. For reception it is the reverse; the CAN transceiver 15, 16, 17 convert the two voltage levels on the CAN bus 14 into suitable levels to the CAN protocol controller 18, 19, 20.

All CAN nodes have a wired-AND connection on CAN_H and CAN_L bus wires; all CAN nodes are directly connected to each other by connecting all the CAN_H wires, and all the CAN_L wires, respectively. Each CAN node 11, 12, 13 can drive the CAN bus 14 into a series of recessive/dominant states, enabling a multi-master communication network according to ISO 11898-2. The CAN protocol data link layer defines how this multi-master sharing of the network is performed, according to a collision detection multiple access (CDMA) operation.

A CAN database is used, among other things, for associating CAN frame identifiers to each CAN node. It can be used as a base for implementation of the frame transmission and reception in each CAN node, as well as being used for analysis of the communication or runtime operation of the CAN nodes by connecting an optional CAN analysis tool. The CAN database may be seen as a lookup table; the identifier is input and the CAN node name is obtained as a result. A CAN identifier has a unique characteristic in that it points to a certain CAN node as being the transmitter or receiver of a certain frame. Other CAN protocol items as Start-of-frame (SOF), acknowledge (ACK), error flag (EF), overload flag (OF) have nothing uniquely associated with a CAN node since they are intentionally identical for all CAN nodes, these events have no identifier included.

This makes a CAN database only potentially useful when an error event occurred that include an identifier and the identifier exist in the database. Further, the CAN database normally implies that any given identifier is only associated to one CAN node as the transmitter.

In this disclosure the terms event, CAN event, error event, protocol event should be interpreted broadly meaning. That is; as an occurrence of a CAN protocol procedure or mechanism defined in CAN data link layer protocol ISO 11898-1 or physical layer ISO 11898-2. Examples are frame transmission, frame reception, frame validation, frame acknowledgement, arbitration, collision resolution, retransmission, error signalling, overload signalling, fault confinement, synchronization, network start up/wakeup. Additional examples of events are procedures that are not defined in CAN data link layer protocol ISO 11898-1 or physical layer ISO 11898-2, and can be such as misbehaviour or misuse of the CAN protocol, e.g. causing interference to the CAN bus communication. Also included are other forms of misbehaviour preventing shutdown of a CAN network, or wakeup the CAN network.

Figure 2:
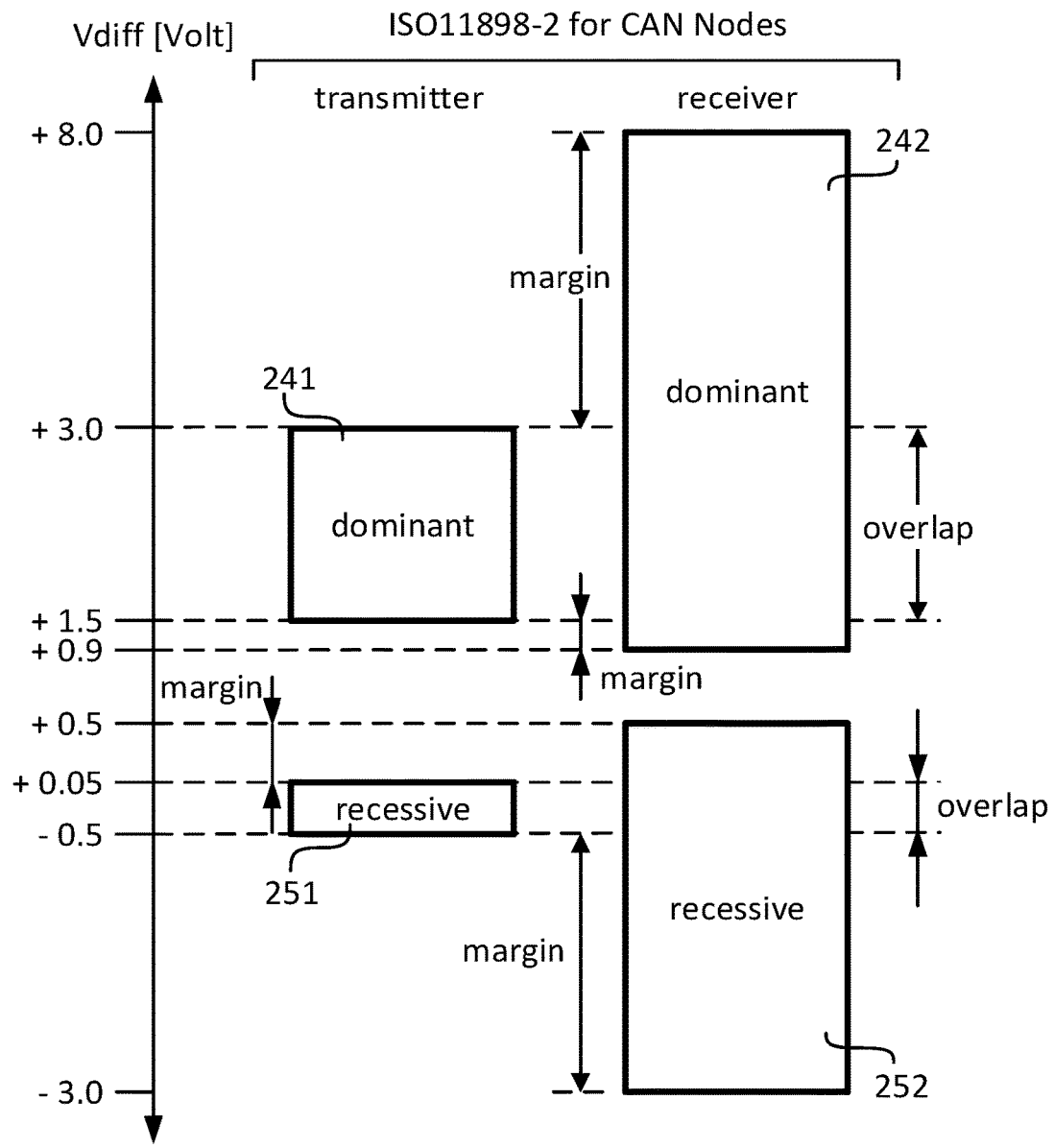
FIG. 2 illustrates stipulated voltage ranges on the CAN bus for recessive and dominant data transferred over the bus, according to standard ISO 11898-2.

FIG. 2 illustrates stipulated voltage ranges on the CAN bus for recessive and dominant data transferred over the bus, according to standard ISO 11898-2.

The CAN bus interconnection of CAN nodes corresponds to a "wired-AND" mechanism. Recessive bits (logic 1) are overwritten by dominant bits (logic 0). In recessive state, a dominant bit from any one or more CAN nodes result in a dominant bus state. As long as no CAN node is sending a dominant bit, the bus is in the recessive state.

In FIG. 2 details are shown for expected CAN bus differential voltage (called Vdiff) values measured between CAN_H and CAN_L wires, for transmitter part of a CAN transceiver (bus driver) and receiver part of a CAN transceiver (bus comparator), where Vdiff is measured as the voltage VCAN_H from bus wire CAN_H to ground, subtracted by the voltage VCAN_L from bus wire CAN_L to ground. The transmitter allowed voltage is in relatively narrow intervals (i.e. intervals 241 and 251) while the receiver must accept wider intervals (i.e. intervals 242 and 252) as recessive and dominant state respectively. This results in receiver tolerance against differences among the Vdiff voltages of the CAN nodes. The voltage Vdiff in dominant state must be between +1.5V and +3.0V on the transmitting CAN node output, in a frame field where it has exclusive access to CAN bus. For a given CAN node, the actual dominant data voltage falls anywhere within this range but is more or less fixed, with slight variation over temperature and loading from bus termination components and impedance of the CAN cables.

For a population of ECUs (i.e. a CAN node) in a single vehicle or a fleet of vehicles, the Vdiff dominant voltage may vary from ECU to ECU within the range +1.5V-+3.0V. The variation is due to several reasons like transceiver hardware production tolerances, different transceiver brands, temperature, ageing and so on. These many reasons are partly why the allowed range from +1.5V to +3.0V exists, to give a robust and tolerant system even with large differences in voltage levels on the same CAN network.

In a CAN bus with 32 CAN nodes ISO-11898-2 allows the CAN dominant state voltage to be higher than +3.0V in some situations. During CAN nodes simultaneous dominant data transmission in an arbitration field, transmission of error flag (EF) or overload flag (OF), or transmission of ACK, the Vdiff dominant voltage is allowed up to be within the range from +1.5V to +50.0V (not shown).

A receiving ECU being compliant with ISO 11898-2 must accept a voltage Vdiff between the two CAN terminals from +0.9V to +8.0V as dominant. For recessive state, Vdiff is in the range from +0.5V to −3.0V; +0.05 to −0.5V for a recessive transmit and +0.5V to −3.0V for a recessive receive. For receiver voltages between 0.5V and 0.9V, the resulting state is undefined but normally there is a recessive-to-dominant and dominant-to-recessive state transition with hysteresis implemented.

Again with reference to FIG. 1, only the CAN node providing the highest voltage is the CAN node dominating the CAN bus voltage Vdiff. This is the intended function of a CAN bus according to ISO 11898-2. At certain protocol events it may happen that more than one CAN bus is driving the CAN bus into dominant state, e.g. for SOF, dominant bits of identifier during arbitration field, ACK, error flag, overload flag. When more than one CAN node is transmitting a dominant state at the same time it cannot always be determined for each CAN node respectively, whether it is transmitting dominant data or recessive data thereby causing a dominant state and a recessive state on the bus, respectively, by analysing bus voltage Vdiff, since all CAN nodes are directly connected to each other via the CAN bus. Determining this is even more difficult if the dominant state output voltage from each CAN node is very close to each other so that they can not be reliably distinguished. This is not a problem in CAN communication for the ECUs but adds difficulty to advanced network analysis.

However, if it is required to analyse whether for instance the first CAN node 11 or the second CAN node 12 or both is actually driving the CAN bus into dominant state, this cannot be determined in a reliable way by measuring the voltage on the CAN bus. It gets more difficult to achieve a method working for all CAN buses in all vehicles including all variables such as transceiver brand, age, temperature and so on, since dominant state output voltage is allowed to vary by a factor 1:2 (+1.5V-+3.0V) and most likely there will be a distribution of voltages where a few ECUs have less Vdiff drive capability than others ECUs on the same CAN bus.

Further, by analysing the current that each CAN node drive into the CAN bus while at the same bit time transmitting dominant data is also a challenge since in principal it is only the CAN node with the highest Vdiff drive capability that force current. Alternatively it is only the CAN nodes with highest Vdiff that actually force a reliably measureable current to flow out of the transceiver CAN_H, through the termination components, impedance of the CAN wires and back into the CAN_L wire of the transceiver.

If it is required to analyse whether for instance the first CAN node 11 or the second CAN node 12 or both is actually driving the CAN bus into dominant state, this cannot be determined in a reliable way by measuring the current flow to/from the transceiver 15, 16 and the CAN bus.

Figure 3:
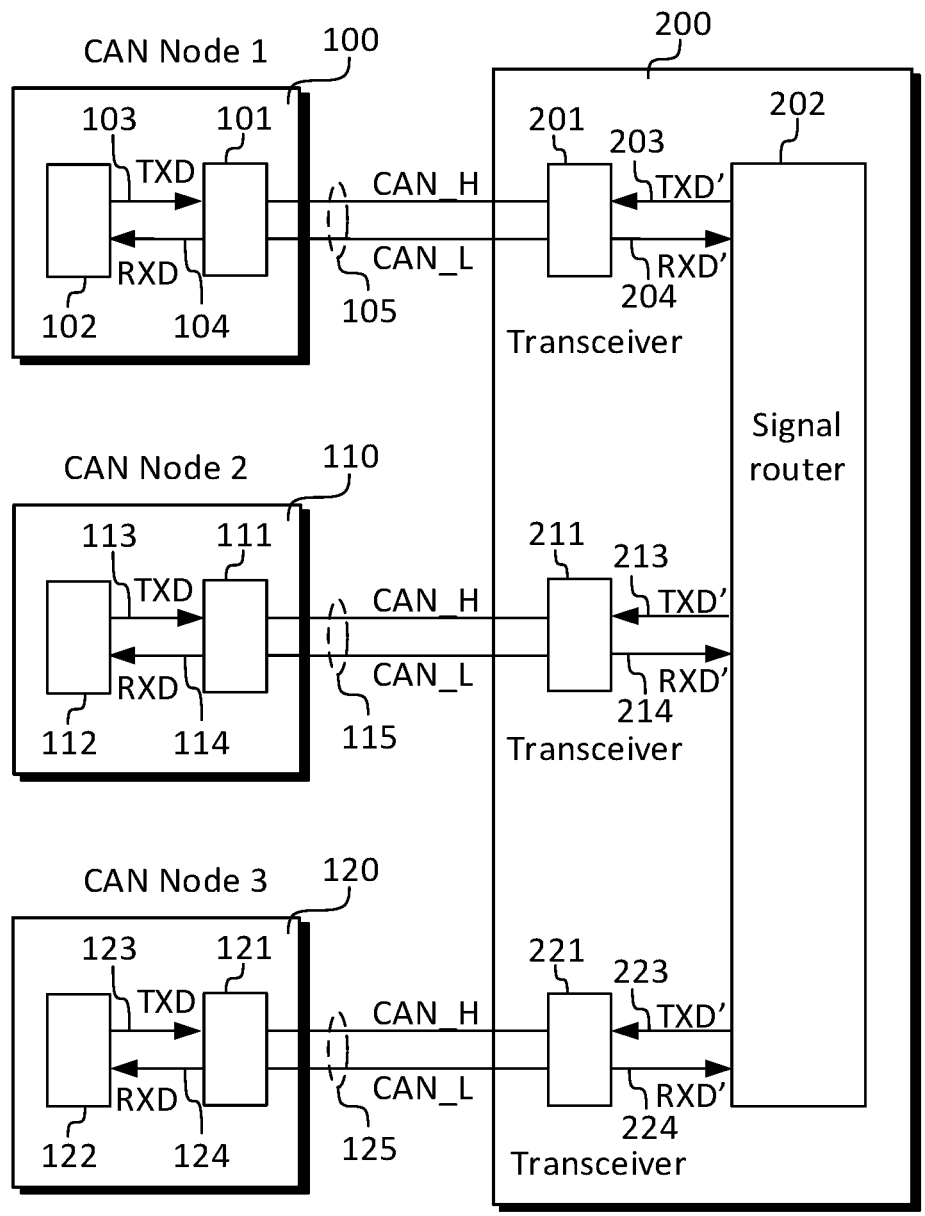
FIG. 3 illustrates a monitoring device 200 according to an embodiment being configured to monitor a plurality of CAN buses.

FIG. 3 illustrates a monitoring device 200 according to an embodiment being configured to monitor CAN nodes 100, 110, 120 being connected to CAN buses 105, 115, 125 connected between the monitoring device 200 and the respective CAN node 100, 110, 120.

At least two CAN buses are connected to the monitoring device 200, where at least one CAN node is connected to each CAN bus. However, a greater number of CAN nodes may be connected to each CAN bus. Further, the monitoring device 200 is configured to transfer signals carried over any one of the CAN buses to the remaining CAN buses. Thus, signals transferred over the first CAN bus 105 is carried over the second CAN bus 115 and the third CAN bus 125, signals transferred over the second CAN bus 115 is carried over the first CAN bus 105 and the third CAN bus 125, and so on.

It is noted that a number of CAN nodes may be connected to a bus. If a certain CAN node is to be monitored, then that CAN node should be the only node connected to a bus. However, it may be envisaged that a group of CAN nodes is to be monitored in a scenario where it is not necessary to distinguish between individual CAN nodes in the group. For instance, it may be desirable to analyse a group of CAN nodes originating from the same manufacturer. If so, the group of CAN nodes can all be connected to the same CAN bus.

As in FIG. 1, the CAN nodes 100, 110, 120 comprise a CAN transceiver 101, 111, 121, a CAN protocol controller 102, 112, 122 and a microcontroller (not shown in FIG. 3). As is understood, a CAN transceiver and a CAN protocol controller is required for any device configured to be connected to a CAN bus. In this example, as in FIG. 1, a CAN controller is part of a micro-controller. In another example, the CAN controller is not part of a micro-controller but is a separate part in a CAN node.

The monitoring device 200 according to an embodiment comprises a CAN transceiver 201, 211, 221 connecting to the respective CAN bus 105, 115, 125.

Further, the monitoring device 200 comprises a signal router 202 configured to route the CAN signals transmitted over any CAN bus to the remaining CAN buses. For instance, any CAN signal transmitted by first CAN node 100 is received by the first CAN transceiver 201 and then routed via the signal router 202 to the second CAN transceiver 211 and the second CAN node 110 as well as to the third CAN transceiver 221 and the third CAN node 120. While the monitoring device 200 is illustrated as a hardware device in FIG. 3, it may also be envisaged that the device can be implemented as a simulation model for simulating behaviour of CAN nodes in the form of e.g. ECUs.

The routing of signals by the signal router 202 is performed since the CAN nodes 100, 110, 120 under test should display the same behaviour as if they were connected to a single CAN bus as shown in FIG. 1. In other words, all of the CAN buses 105, 115, 125 should be exposed to the same data. The routing of signals 203, 204, 213, 214, 223, 224 can be made by means of electrical signals, via optical paths, radio frequency paths or other electro-magnetic paths.

Hence, assuming that a "real-world" scenario is to be tested using the setup of FIG. 3. One or more of the CAN nodes 100, 110, 120 may be triggered to perform a selected action resulting in event occurring on the CAN buses, i.e. CAN data being sent from one of the CAN nodes 100 via the bus 105 to the monitoring device 200 is routed to the remaining CAN nodes 110, 120 over the respective bus 115, 125.

Figure 4:
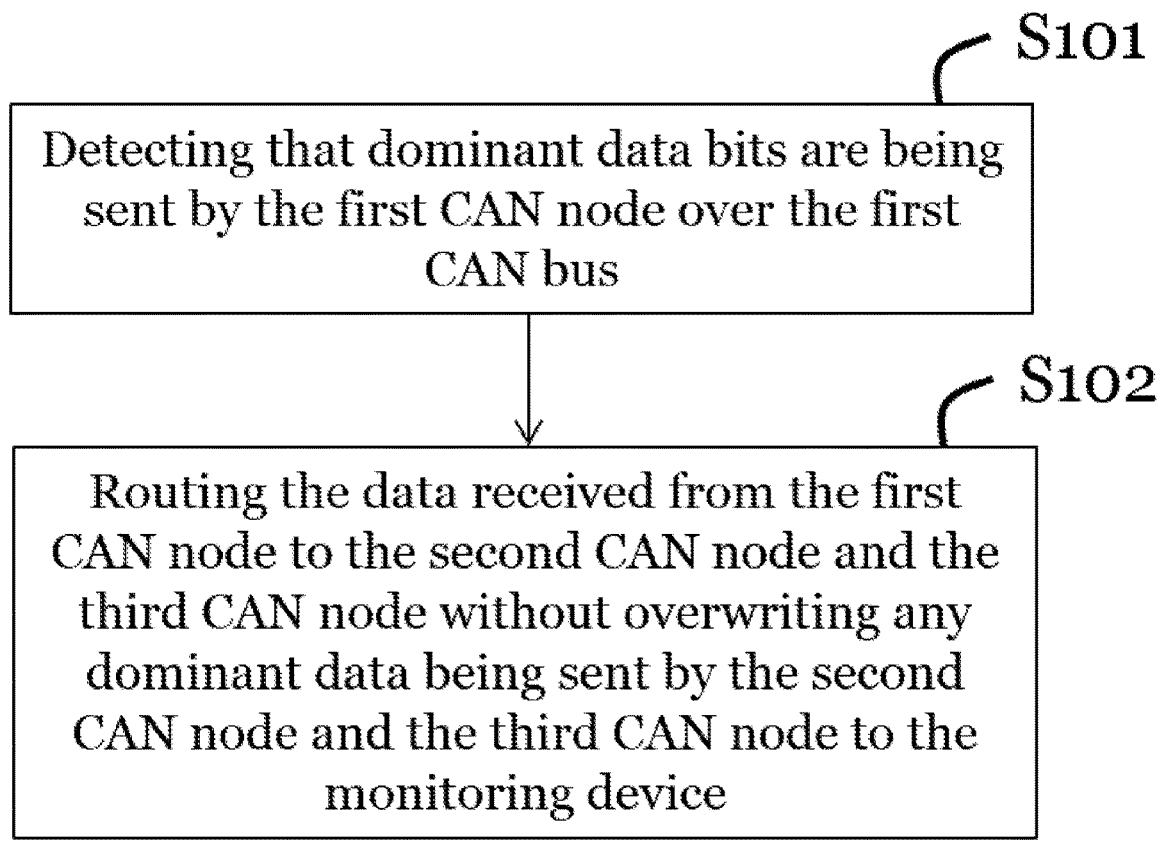
FIG. 4 shows a flowchart illustrating a method of the monitoring device of monitoring a plurality of CAN buses according to an embodiment.

Reference will further be made to FIG. 4 showing a flowchart illustrating a method of the monitoring device 200 of monitoring the plurality of CAN buses 105, 115, 125 according to an embodiment.

Hence, the monitoring device 200 monitors, for each of the CAN nodes 100, 110, 120, any event occurring on the CAN buses 105, 115, 125. That is, any data sent via the CAN bus of each CAN node is monitored by the monitoring device 200. In this particular example, it is assumed that the first CAN node 100 sends data over the first CAN bus 105 to the first CAN transceiver 201 of the monitoring device 200.

In order to re-create the situation where all the CAN nodes 100, 110, 120 are connected the CAN bus as previously has been illustrated with reference to FIG. 1, the monitoring device 200 receives the CAN data via the first CAN transceiver 201, performs a detection process in step S101 (to be described in detail below) and routes in step S102 the CAN data via signal RXD' over path 204 to the signal router 202 and further on via a) signal TXD' over path 213 to the second CAN transceiver 211 over the second CAN bus 115 to the second CAN node 110, and b) signal TXD' over path 223 to the third CAN transceiver 221 over the third CAN bus 125 to the third CAN node 120.

Advantageously, the CAN nodes 100, 110, 120 are analysed in a non-intrusive manner. The CAN nodes 100, 110, 120 are no longer electrically directly connected to each other on a physical layer, but remains connected on a datalink layer. It is to be noted that for any new vehicle, the monitoring device 200 may be implemented from scratch in the manner illustrated in FIG. 3, while for an existing vehicle implementing the prior art CAN bus of FIG. 1, the bus would have to be "broken up" such that the monitoring device 200 can be connected as shown in FIG. 3.

Thus, datalink timing between the CAN nodes remains unaffected and the CAN nodes share all events (transmitted recessive and dominant bits) exactly as if the CAN nodes were still directly connected to each other via a single CAN bus. This is applicable for all possible events, including events that are outside the defined events in the CAN protocol.

Hence, with the routing of data over the remaining CAN buses 115, 125 to the remaining CAN nodes 110, 120, the monitoring device 200 does not affect the CAN network in a manner such that the behaviour of the CAN nodes changes; the CAN nodes 100, 110, 120 will act as if they are connected to a single CAN bus.

However, while the monitoring device 200 receives data over the RXD' wire 204 from the first CAN node 100, the event detection device 200 may simultaneously send data, for instance originating from the second CAN node 110, to the first CAN node 100 via TXD' wire 203.

This implies that each CAN bus 105, 115, 125 may be driven dominant by both the CAN nodes (in this example the first CAN node 100) and also by the monitoring device 200 at the same time, since the monitoring device 200 routes data received over any one of the CAN buses to the remaining CAN buses. Driving a CAN bus dominant from the CAN node side and from the monitoring device side suggests a potential problem, in that the monitoring device 200 cannot determine why the CAN bus 105 is dominant. That is, whether it is because the first CAN data 100 is transmitting dominant data bits or because the monitoring device 200 itself is transmitting dominant data bits.

If not resolving this critical problem, the monitoring device 200 may latch up and never release the dominant state to which it has driven the CAN bus 105. The latch up problem would occur as soon as at least two CAN nodes out of CAN nodes 100, 110, 120 transmit dominant data bits, thereby causing a dominant state, at the same time.

Thus, in step S101, the monitoring device 200 detects if any dominant data bits are being sent by any CAN node, 100, 110, 120 over the respective CAN bus 105, 115, 125. In this particular example, the monitoring device 200 detects that dominant data is being sent over the first CAN bus 105 by the first CAN node 100.

Further, if the first CAN node 100 is the one sending the dominant data bits, these dominant bits are routed in step S102 to the second CAN node 110 and the third CAN node 120, in a manner such that the routed dominant bits do not overwrite any dominant bits transferred by the second CAN node 110 and the third CAN node 120 over the CAN buses 115, 125.

Advantageously, any dominant data received by the monitoring device 200 over any CAN bus 105, 115, 125 is routed to the CAN nodes 100, 110, 120 connected to the remaining CAN buses 105, 115, 125.

As an example, dominant data received from the first CAN node 100 over the first CAN bus 105 is routed to the second CAN node 110 over the second CAN bus 115 and to the third CAN node 120 over the third CAN bus 125.

Further, any dominant data simultaneously received by the monitoring device 200 for instance from the second CAN node 110 over the second CAN bus 115 is routed to the first CAN node 100 over the first CAN bus 105 and to the third CAN node 120 over the third CAN bus 125, in a manner such that the dominant data received from the first CAN node 100 to not overwrite the dominant data received from the second CAN node 110, and vice versa.

Hence, the above described latch up problem is advantageously overcome.

Figure 5:
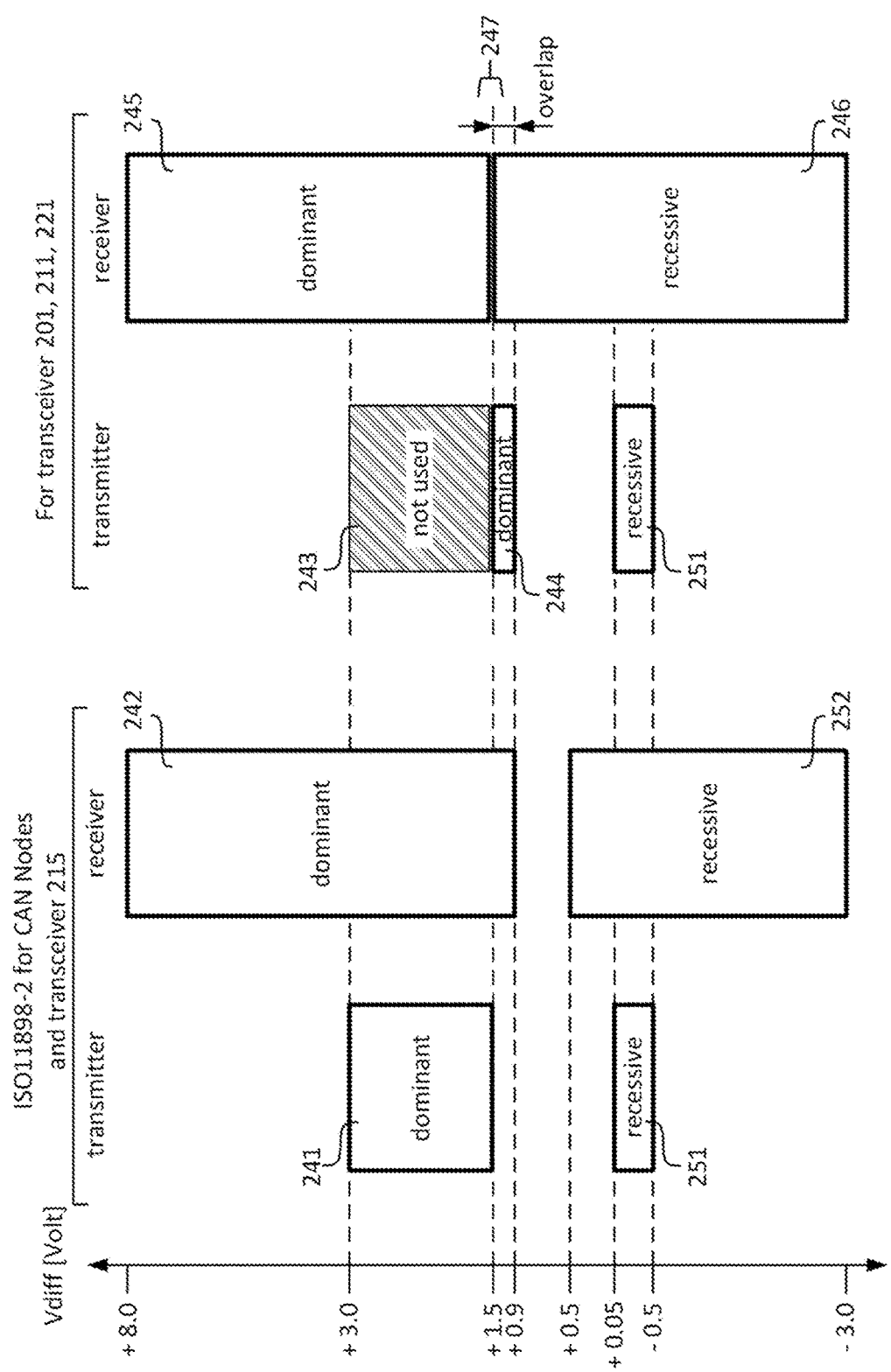
FIG. 5 illustrates on a right-hand side stipulated voltage ranges on the CAN buses for recessive and dominant data of the monitoring device according to an embodiment.

With reference to FIG. 5, in an embodiment, the dominant data bit detection is performed as will be described in the following. In FIG. 5, the voltage diagram on the left-hand side is identical to that previously illustrated in FIG. 2, i.e. the requirements stipulated in ISO 11898-2. Hence, the CAN nodes 100, 110, 120 are all configured to output data where a voltage Vdiff between the pair of CAN wires of each CAN bus is in a range complying with a required transmit voltage range stipulated by the CAN standard ISO 11898-2.

However, the voltage diagram on the right-hand side illustrates voltage levels which the monitoring device 200 is configured to comply with according to an embodiment. In the voltage diagram on the right-hand side, it is illustrated that the monitoring device 200 is configured to output dominant data bits to the CAN nodes at a voltage level at least exceeding a minimum receive voltage level stipulated by the CAN standard for dominant data bits, i.e. at least +0.9V, but not overlapping with the voltage level with which the CAN nodes are configured to output dominant data bits, i.e. below +1.5V. That is, the dominant data bits are outputted by the monitoring device 200 at a voltage level falling into range 244, where the range 244 does not overlap with range 241. However, range 244 is configured to overlap with range 242, such that the CAN nodes will perceive a voltage in range 244 as dominant data being sent by the monitoring device 200.

Further, the monitoring device 200 is configured to receive dominant data at a voltage level at least being in the range 241 with which the CAN nodes 100, 110, 120 are configured to output dominant data, i.e. in the range +1.5V-+3.0V, even though dominant receive range of the monitoring device 200 typically would be configured to be in range 245, i.e. +1.5V-+8.0V. For the monitoring device 200, the dominant transmit range 244 should not overlap with the dominant receive range 245, since that would cause a latch-up on the CAN bus.

To comply with recessive receive stipulated in ISO 11898-2, range 246 should at least overlap with range 251, but preferably also with range 252 (but not with range 241), even though the range 246 could extend over the voltage span illustrated in FIG. 5. Further, the monitoring device 200 should interpret its own dominant transmit data voltage range 244 as recessive receive, implying that range 246 overlaps with range 244. The boundary range between ranges 245 and 246 is denoted 247.

As a result, the monitoring device 200 will advantageously detect a dominate state driven by any of the CAN nodes 100, 110, 120 in case the voltage on the buses 105, 115, 125 is +1.5V or more, since range 241 overlaps with range 245, while the monitoring device 200 knows whether itself is transmitting dominant or recessive bits. In other words, since the monitoring device 200 knows whether it is sending dominant or recessive bits, it does not matter that dominant bits of the CAN nodes 100, 110, 120 (at +1.5V-+3.0V) effectively overwrite dominant bits of the monitoring device 200 (at +0.9V-below 1.5V).

The receiver dominant detection voltage range of the monitoring device 200 (defined by voltage interval 245) is configured not to overlap its transmitter dominant voltage interval 244. Further, the Vdiff voltage where transition recessive-to-dominant and transition dominant-to-recessive occur and is provided by transceiver 201, 211, 221 output signals RXD, lies between voltage intervals 245 and 246 (i.e. the boundary range 247).

Figure 6:
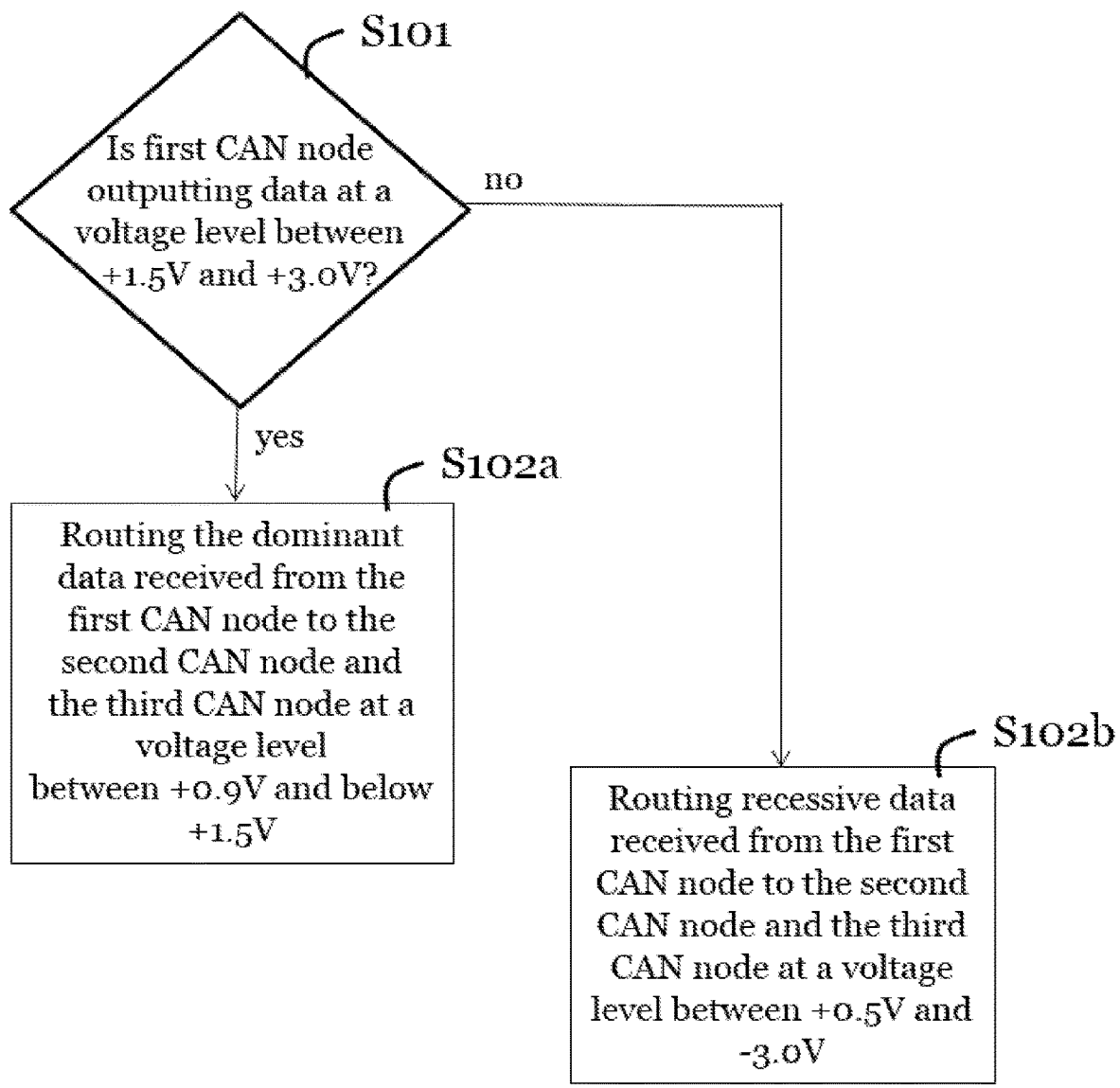
FIG. 6 shows a flowchart illustrating a method of the monitoring device of monitoring the plurality of CAN buses according to an embodiment.

Reference will further be made to FIG. 6 showing a flowchart illustrating a method of the monitoring device 200 of monitoring the plurality of CAN buses 105, 115, 125 according to the embodiment discussed with reference to FIG. 5.

As can be seen, if the monitoring device 200 detects that the voltage of the data sent over the first CAN bus 105 from the first CAN node 100 is in the range +1.5V-+3.0V in step S101, the correspondingly dominant data received from the first CAN node 100 is routed to the second CAN node 110 and the third CAN node 120 over the second and third CAN bus 115, 125 at a voltage level between +0.9V and just below +1.5V in step S102a. Advantageously, this avoids overwriting any dominant data simultaneously being written to the second CAN bus 115 by the second CAN node 110 and/or to the third CAN bus 125 by the third CAN node 120. As previously mentioned, in some situations the Vdiff dominant voltage of range 241 is allowed to be between +1.5V and +5.0V.

In another scenario, if the data over the first CAN bus 105 is not in the range +1.5V-+3.0V in step S101—and the monitoring device 200 is not sending dominant data over the first CAN bus 105, thereby indicating that dominant data is not being sent by the second CAN node 110 and/or by the third CAN node 120—recessive data is received from the first CAN node 100, which is routed in step S102b from the first CAN node to the second CAN node and the third CAN node at a voltage level between +0.5V and −3.0V. It should be noted that if any one of the other CAN nodes 110, 120, for instance the second CAN node 110, would transmit dominant data, that particular dominant data would be routed to the first CAN node 100 and the third CAN node 120, and any recessive data from the first CAN node 100 would thus be overwritten.

Figure 7:
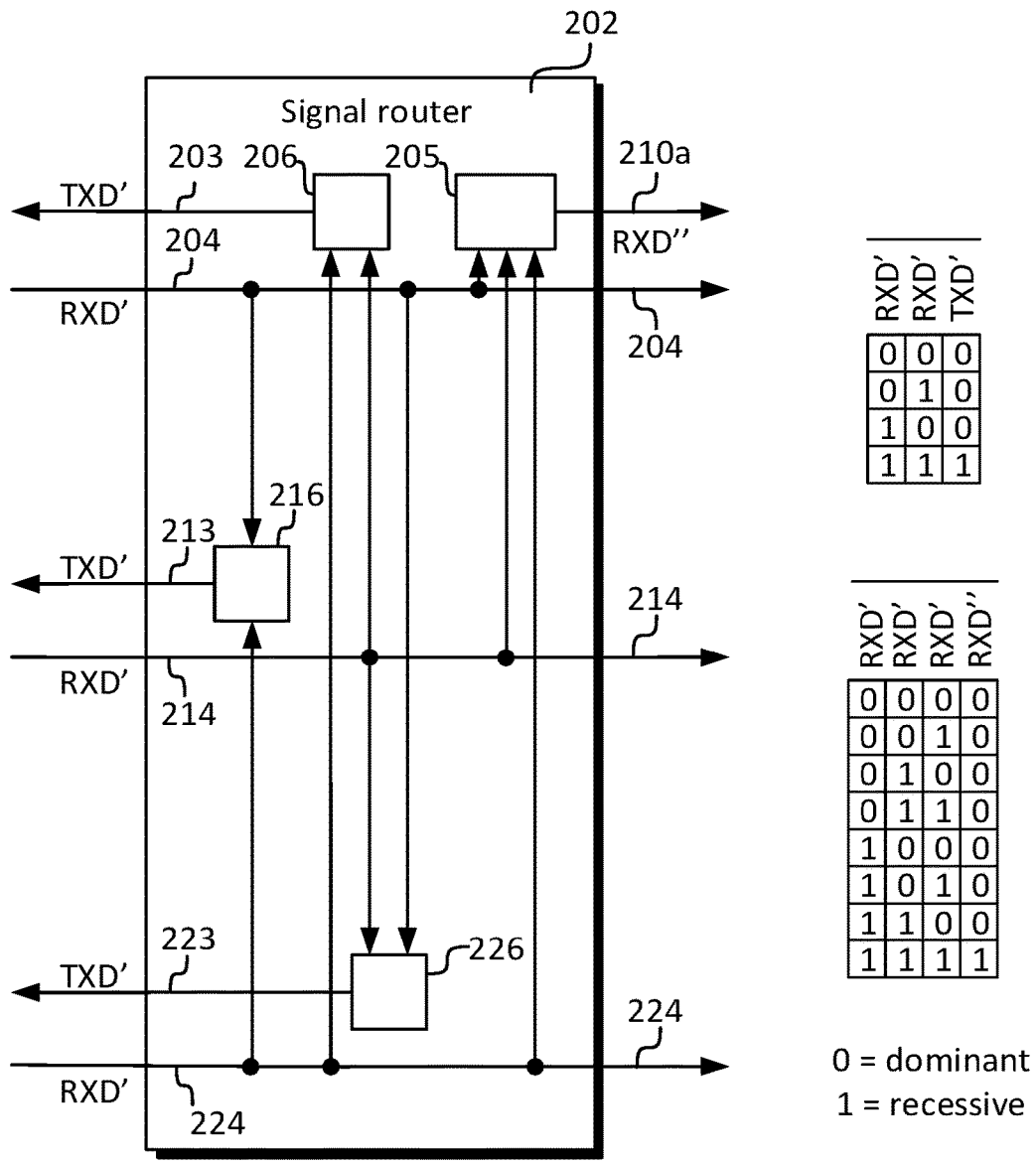
FIG. 7 illustrates an embodiment where a signal router of the monitoring device encodes data received from the respective CAN node.

FIG. 7 illustrates a further embodiment, where the signal router 202 of the monitoring device 200 encodes data received from the respective CAN node.

Hence, data received from the first CAN node 100 via the first CAN transceiver 201 with signal RXD' over path 204 is combined in a first encoder 216 with data received from the third CAN node via the third CAN transceiver 221 with signal RXD' over path 224. As can be seen in the upper table, if any combined bits of the received data is 0, then the output of the first encoder is 0. As a consequence, the signal router 202 will output dominant data, i.e. a 0, indicating a dominant state with the signal TXD' over path 213, which 0 the second CAN transceiver 211 converts to a voltage in the range +0.9V to just below +1.5V and outputs to the second CAN node 110 as soon as any one or both of the first CAN node 100 and the third CAN node 120 outputs dominant bits (i.e. a 0 represented by a voltage in the range +1.5V-+3.0V).

Correspondingly, a second encoder 206 receives data from the second CAN node 110 and the third CAN node 120 and outputs a 0 to the first CAN node 100 if any one or both of the second CAN node 110 and the third CAN node 120 transmits a 0, i.e. a dominant bit, while a third encoder 226 receives data from the first CAN node 100 and the second CAN node 110 and outputs a 0 to the third CAN node 120 if any one or both of the first CAN node 100 and the second CAN node 110 transmits a 0.

As can be concluded, if data received from any one of the CAN nodes over the CAN buses indicates a dominant state in the form of a 0 represented by a voltage in the range +1.5V-+3.0V, the encoders will output a dominant bit in the form of a 0, which the associated CAN transceivers transmits to the remaining CAN nodes in the form of a voltage in the range from +0.9V to just below +1.5V.

As further can be seen in FIG. 7 (and also in FIG. 3), the monitoring device 200 monitors any data transmitted by the CAN nodes 100, 110, 120 via the respective signal RXD' over paths 204, 214, 224. This data may subsequently be mapped to a CAN event database to determine which particular CAN event each CAN node is signalling.

In a further embodiment, also described with reference to FIG. 7, the signal router 202 comprises a fourth encoder 205, where data received from the first CAN node 100 via the first CAN transceiver 201 with the signal RXD' over path 204 is combined with data received from the second CAN node 110 via the second CAN transceiver 211 with the signal RXD' over path 214 and with data received from the third CAN node 120 via the third CAN transceiver 221 with the signal RXD' over path 224. Again, as can be seen in the lower table, if data received from any one of the CAN nodes indicates a dominant state in the form of a 0 represented by a voltage in the range +1.5V-+3.0V, the fourth encoder will output a dominant bit in the form of a 0 over wire 210*a*. The signal RXD" sent over path 210*a* is routed to a CAN protocol handling device 230, as will be discussed in the following.

Figure 8A:
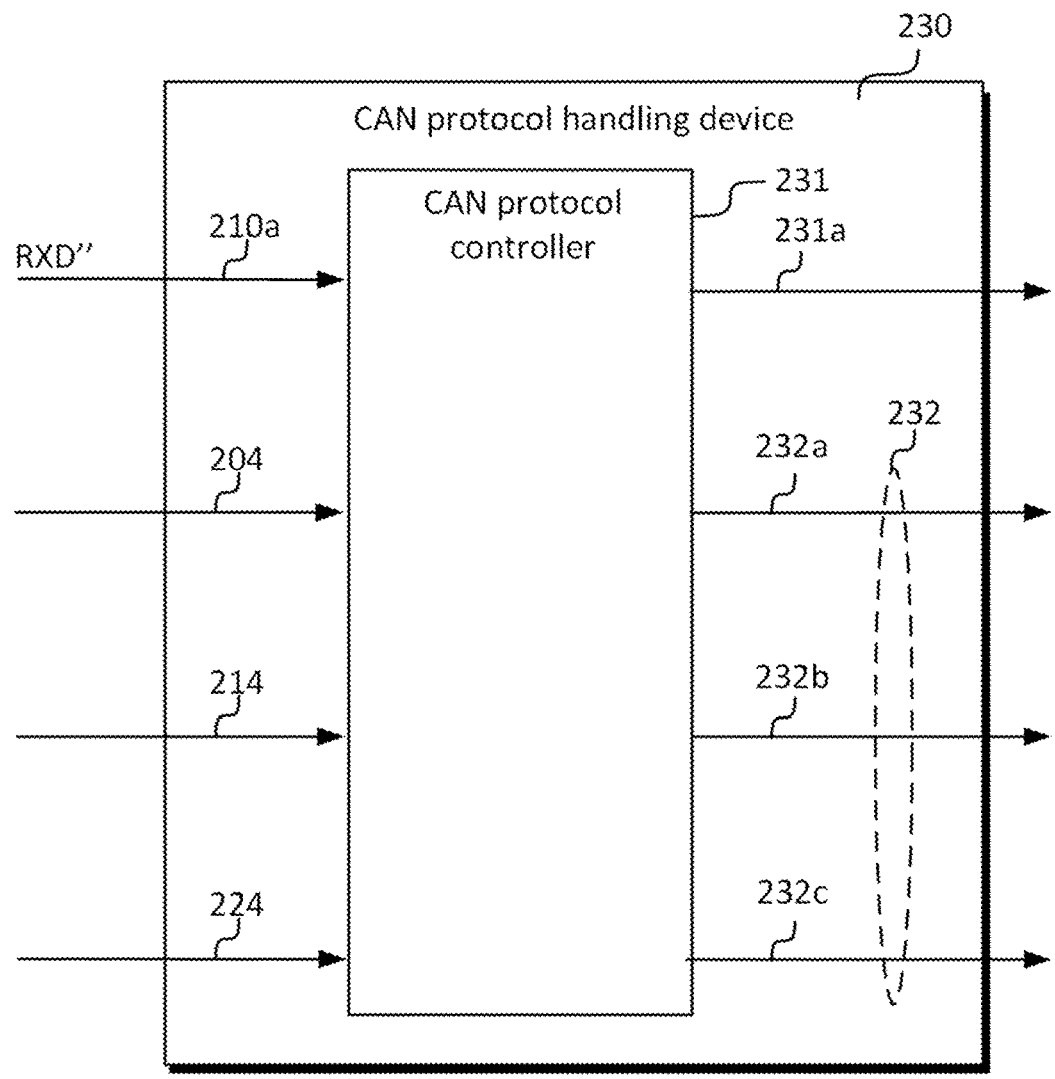
FIG. 8a illustrates a CAN protocol handling device of the monitoring device according to an embodiment.

FIG. 8*a* illustrates the CAN protocol handling device 230 according to an embodiment, which functionally comprises a CAN protocol controller 231, which CAN protocol handling device 230 utilizes the signal RXD" carried over path 210*a*.

Figure 8B:
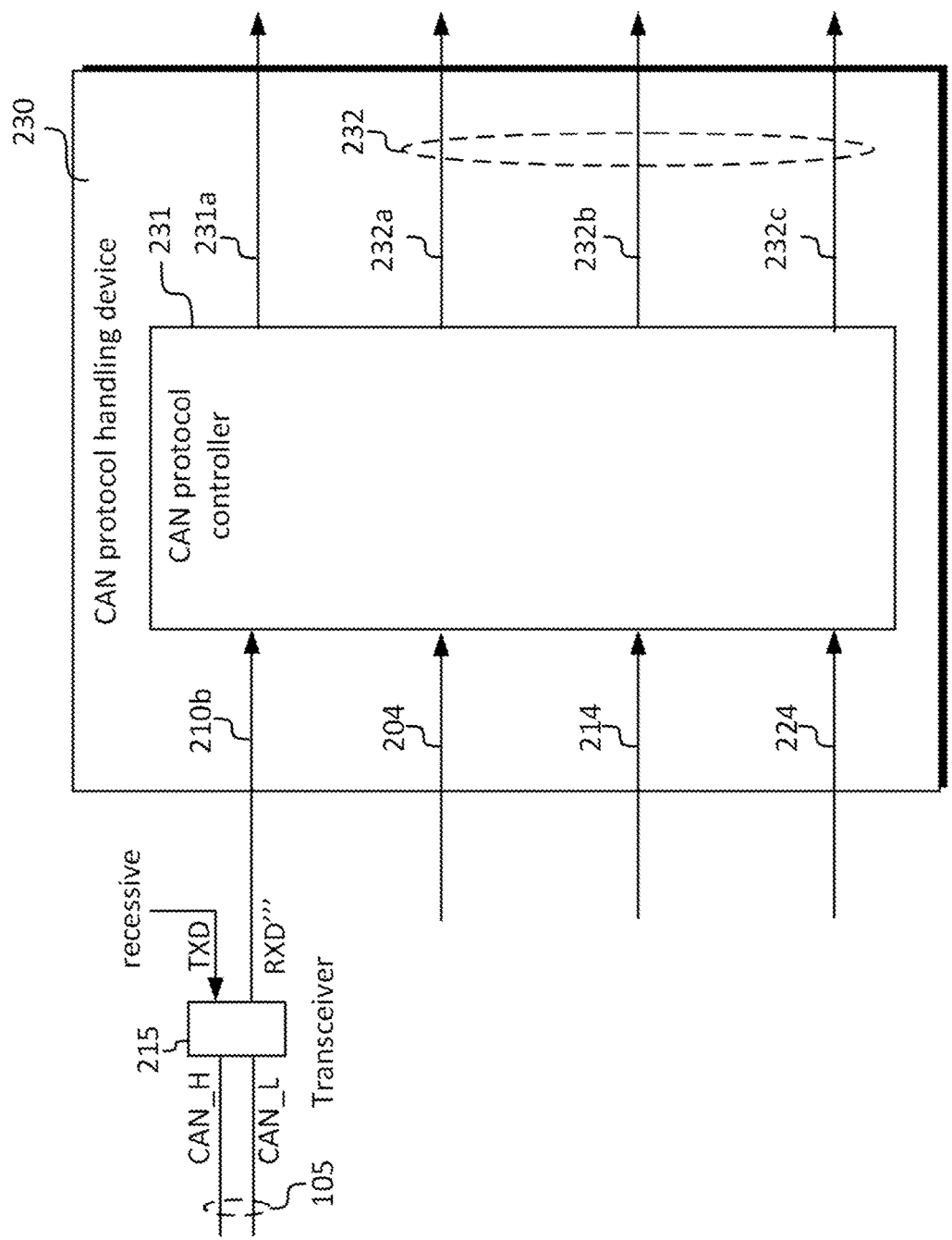
FIG. 8b illustrates a CAN protocol handling device of the monitoring device according to another embodiment.

FIG. 8*b* shows the CAN protocol handling device 230 utilizing an alternative signal RXD'" carried over path 210*b* according to an embodiment.

Path 210*b* serves the same purpose as the signal path 210*a*; to provide a combined signal where data being carried over the CAN buses 105,115,125 is routed to the CAN protocol handling device 230. Since the monitoring device 200 routes data from the second CAN bus 115 and the third CAN bus 125 to the first CAN bus 105, the data on the first CAN bus 105 (or that on any bus) represent combined data from the first, second and third CAN nodes 100, 110, 120. A transceiver 215 is connected to CAN bus 105 via CAN wires CAN_H and CAN_L, and the RXD wire 210*b*, The transceiver 215 has the same voltage ranges for reception as the CAN Nodes 100,110,120, which are according to ISO 11898-2.

In one example the transceiver 215 only uses its receiver part while the transmitter part is not used and therefore the transmitter input TXD signal is permanently tied to a recessive state. In another example the transceiver 215 is instead a receiver and there is no transmitter or TXD signal provided.

With reference to FIGS. 8*a* and 8*b*, the signal 210*b* or alternatively the signal 210*a* output from the fourth encoder 205 (discussed with reference to FIG. 7) which combines signals from all the CAN nodes 100, 110, 120 is supplied to the CAN protocol controller 231. The CAN protocol controller 231 monitors all events from each CAN node as one composite signal 210*a* (or 210*b*), which signal 210*a* (or 210*b*) represents what each CAN node 100, 110, 120 actually is seeing on the respective CAN bus 105, 115, 125 (corresponding to the data being transferred over the CAN bus 14 of FIG. 1), in this particular example the data sent by the first CAN node 100 as previously discussed. Further, the CAN protocol controller 231 is capable of interpreting the data received with signal 210*a* or 210*b* in the context of a CAN frame. Thus, the CAN protocol controller 231 maps the data received with signal 210*a* or 210*b* into a CAN frame (or a plurality of CAN frames). The CAN protocol controller 231 does not acknowledge CAN frames and do not perform error signalling since it has no TXD path back to any of the transceivers 201, 211, 221 or 215, encoder 205. This is intentional since it must not affect the data that it shall monitor. However it has error detection, e.g. format error, CRC error and so on.

In one embodiment the transceivers 201, 211, 221 does not support being set to standby mode and continuously pass all symbols like frames and wakeup patterns and any dominant state not recognized as a valid CAN protocol symbol to CAN protocol controller 231. The CAN protocol controller 231 is configured to recognize wakeup patterns according to ISO 11898-1.

The CAN protocol controller 231 is in an embodiment capable of encoding the data received over paths 210*a* or 210*b* into CAN frames as specified in the CAN standard. Examples of such CAN frames will be given hereinbelow. These CAN frames may be provided for display to an operator of the monitoring device 200 via path 231*a*

Further, the CAN protocol controller 231 is in an embodiment capable of mapping events indicated by the CAN frames to specific CAN nodes, and providing this information via paths 232*a*, 232*b*, 232*c* such as for instance "ACK received from the first CAN node 100" via path 232*a*, "ACK not received from the second CAN node 110" via path 232*b*, etc.

In a further embodiment, the CAN protocol controller 231 is capable of mapping events relating to error signalling to specific CAN nodes, and providing this information via paths 232*a*, 232*b*, 232*c* such as for instance "active error flag received from the first CAN node 100" via path 232*a*, etc.

In the next following sections, signal waveforms of the monitoring device 200 for three events are shown; frame transmission with successful acknowledgment, ACK slot error and error signalling. It should be noted that when monitoring CAN nodes, a large number of events exists, including for instance error flag, form error, stuff error, CRC error, unknown frame transmission, etc.

Any CAN frame format may be used, but the following figures show CAN frames according to Classical Base Frame Format (CBFF), Included are also the TXD signals 103, 113, 123 from the CAN nodes 100, 110, 120. Those TXD signals are not available to the monitoring device 200. However, their waveforms are recreated by the transceivers 201, 211, 221 in the monitoring device 200 as signals 204, 214, 224 and are shown for illustrational purposes.

Figure 9:
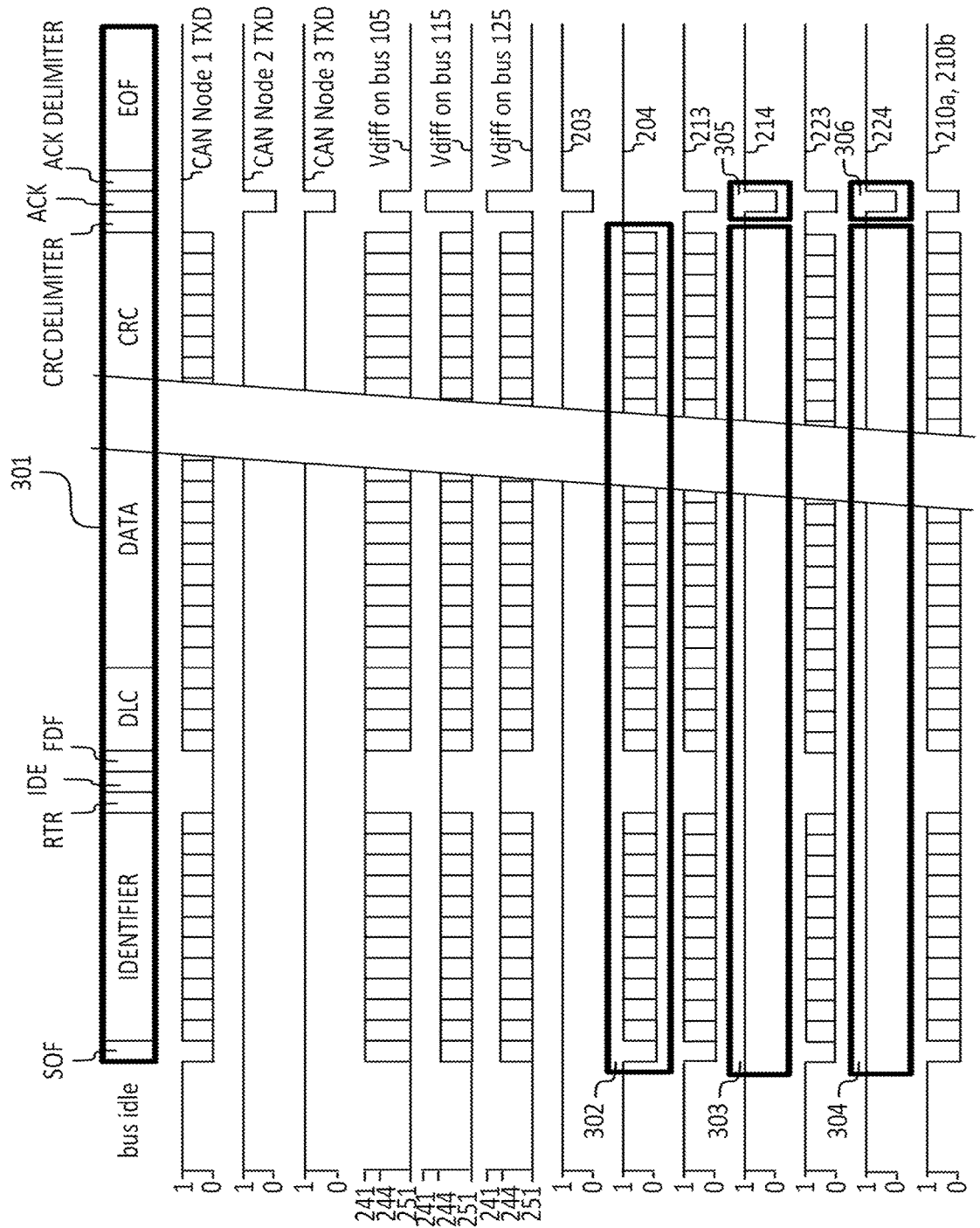
FIG. 9 illustrates CAN frame transmission performed by the first CAN node and successful reception and acknowledgement by the second and third CAN nodes.

FIG. 9 illustrates CAN frame transmission performed by the first CAN node 100 and successful reception and acknowledgement by the second and third CAN nodes 110, 120. The second and third CAN nodes 110, 120 acknowledge the frame and therefore CAN node 100 interpret the transmission as successful and no faults are detected by CAN node 100.

As can be seen in FIG. 9, an event is detected by the CAN protocol controller 231 detecting a Start-Of-Frame (SOF) bit in the combined RXD signal 210*a* or 210*b*, i.e. the signal representing the data being transferred over the CAN buses.

This is the very first dominant data bit shown in signal 210a, 210b at the bottom of the transmission diagram. In the CAN protocol, any dominant bit following a sequence of ii recessive bits will be interpreted as the SOF bit. A CAN frame further comprises a remote transmission request (RTR) bit, an identifier extension (IDE) bit, a flexible data-rate frame (FDF) bit, data length code (DLC) bits, data bits (in case of a data frame), cyclic redundancy checksum (CRC) bits, a CRC delimiter bit, an acknowledge (ACK) bit, an ACK delimiter bit, and end-of-frame (EOF) bits.

Figure 10:
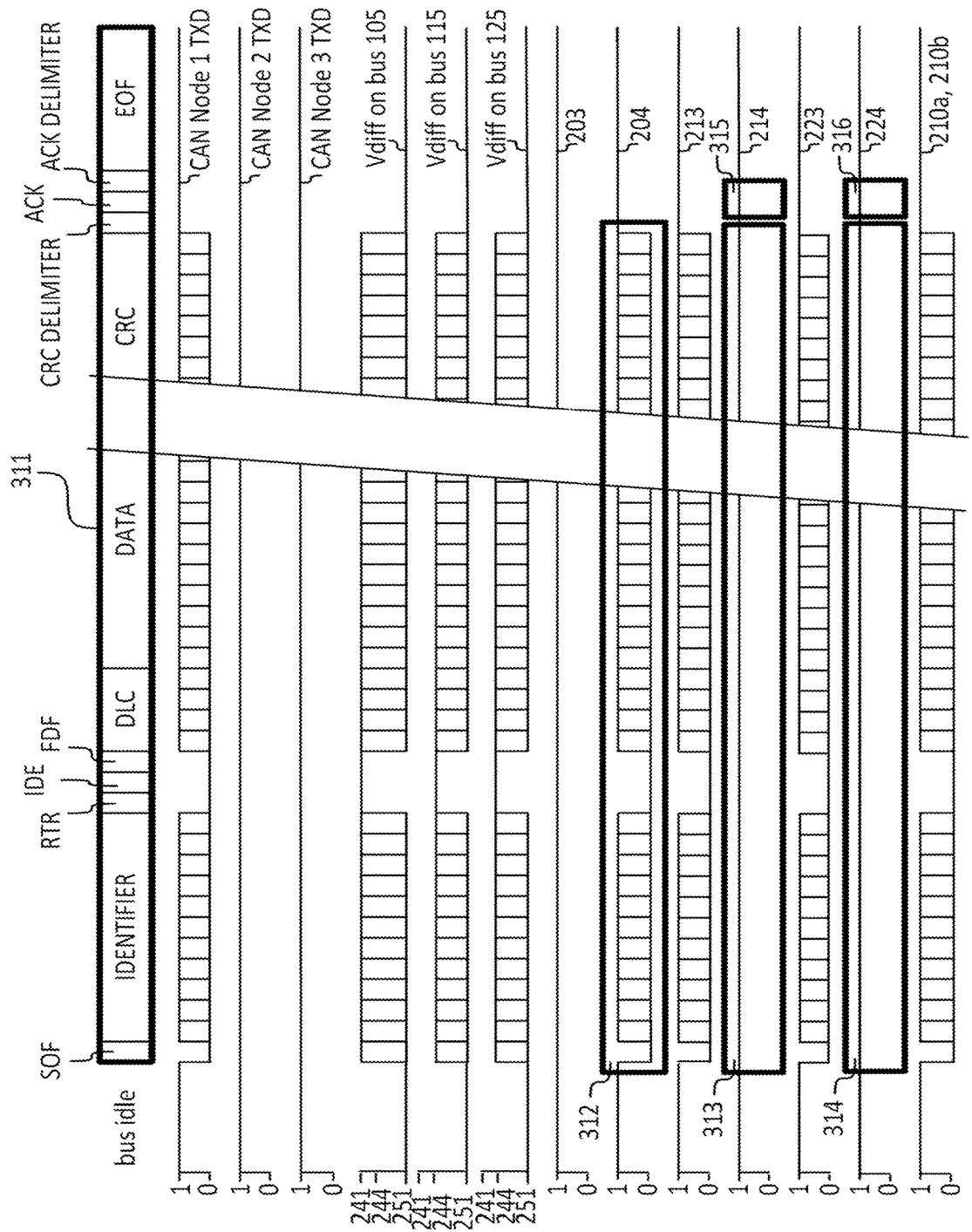
FIG. 10 illustrates CAN frame transmission which is not successfully acknowledged by the second and third CAN nodes.
Figure 11:
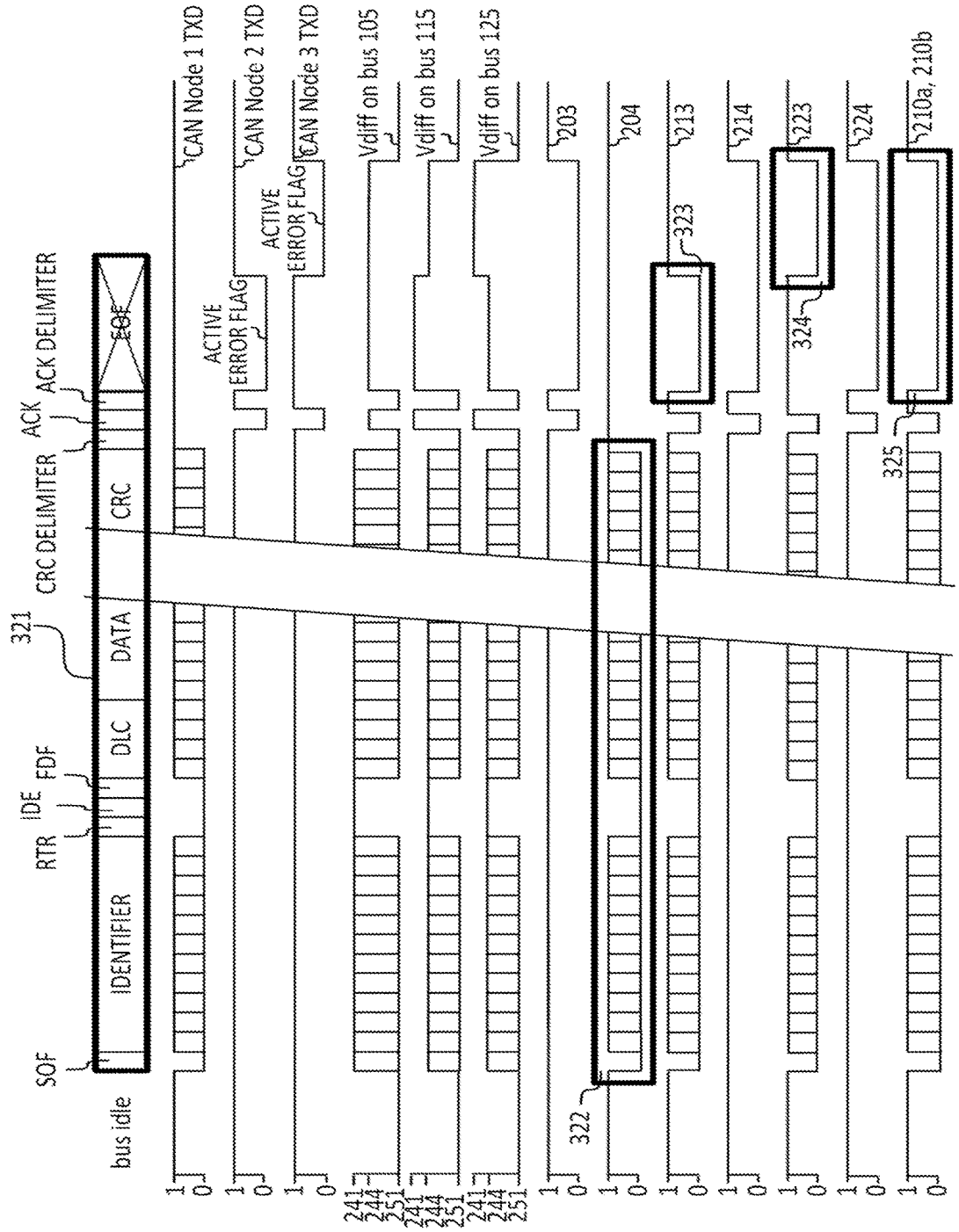
FIG. 11 illustrates CAN frame transmission with error signalling by the second and third CAN nodes due to a cyclic redundancy checksum (CRC) error and a stuff error.

It is noted that in FIGS. 9-11, for illustrative purposes, a part of the DATA field of the respective CAN frame 301, 311, 321 (and the corresponding sections of the remaining signals) has been compressed in time as this field may contain up to 512 bits.

If at the time of detection of the SOF any of the RXD' signals over paths 204, 214, 224 is 0 (i.e. dominant), then the corresponding CAN node is identified as being the CAN node transmitting the CAN frame 302, 303, 304 comprising the data transported with signals 210a or 210b. While both the RXD' signal carried over path 214 for the second CAN node 110 and the RXD' signal carried over path 224 for the third CAN node 120 is 1 (i.e. recessive), the RXD' signal carried over path 204 for the first CAN node 100 is indeed 0. Thus, the first CAN node 100 must be the source of the data received over paths 210a, 210b. A further possibility is that two CAN nodes start frame transmission at the same time, therefore more than one of the signals 204, 214, 224 may indicate a dominant SOF bit while 210a, 210b indicates a SOF, and following this, arbitration is performed in the IDENTIFIER field.

With reference to the voltage difference Vdiff of the signals carried over the CAN buses 105, 115, 125, in this example the first CAN node 100 drives the bus into a dominant state resulting in a Vdiff in the range 241 (cf. FIG. 5). The monitoring device 200 will thus conclude that it is the first CAN node 100 that sends the dominant data bit over the first CAN bus 105, and as a result route that dominant bit to the second and the third CAN node 110, 120 via paths 213, 223, respectively, over the second and third CAN bus 115, 125 at a Vdiff in the range 244.

The CAN protocol controller 231 will then encode the data sent by the first CAN node 100 and received over path 210a or 210b into a CAN frame until an acknowledgement slot (ACK) is encountered towards the end of the CAN frame.

As can be seen, at the time of the ACK slot being encountered in the frame, CAN bus combination signal 210a or 210b indicates dominant data being transmitted over the CAN buses, and the CAN protocol controller 231 detects from paths 214, 224 that both the second CAN node 110 and the third CAN node 120 is transmitting dominant data thereby successfully acknowledging reception of the CAN frame, indicated with 305 and 306.

Again, with reference to the voltage difference Vdiff of the signals carried over the CAN buses 105, 115, 125; at the time of ACK, in this example the second CAN node 110 and the third CAN node 120 both drive the bus into a dominant state resulting in a Vdiff in the range 241. As a result, the monitoring device 200 will route a dominant bit to the first CAN node 100 via path 203 over the first CAN bus 105 at a Vdiff in the range 244.

FIG. 10 illustrates frame transmission which is not successfully acknowledged by the second and third CAN nodes 110, 120. Now, up until the ACK slot of the CAN frame 311 is encountered, the behaviour is the same as that described with reference to FIG. 9. Hence, if at the time of detection of the SOF any of the RXD' signals over paths 204, 214, 224 is 0 (i.e. dominant), then the corresponding CAN node is identified as being the CAN node transmitting the CAN frame 312, 313, 314 comprising the data transported with signals 210a or 210b.

However, in this scenario, at the time of the ACK slot being encountered in the frame, CAN bus combination signal 210a or 210b does not indicate dominant data being transmitted over the CAN buses, which should have been the case should the CAN frame have been received successfully.

The CAN protocol controller 231 detects from paths 214, 224 that both the second CAN node 110 and the third CAN node 120 is transmitting recessive data, so reception of the CAN frame is not successfully acknowledged. The CAN frame 311 may thus have to be retransmitted (not shown), since the second CAN node 110 and the third CAN node 120 both indicate that they have not received the frame, as illustrated by 315, 316 comprising recessive data, while an ACK should be signalled with dominant data.

FIG. 11 illustrates a slightly more complex scenario in the form of a CRC error. Again, up until the ACK slot of the CAN frame 321 is encountered, the behaviour is the same as that described with reference to FIGS. 9 and 10. Hence, the first CAN node 100 is identified as being the CAN node transmitting the CAN frame 322 comprising the data transported with signals 210a or 210b.

However, after the second CAN node 110 acknowledges receipt of the frame 321, it sends an active error flag 323 indicating that the CRC is not correct, and thus "destroys" the frame such that it should not be read by the other CAN nodes 100, 120. In this example the CAN node 110 has an incorrect behaviour in that it first acknowledges the received frame as valid (including correct CRC checksum) by transmitting a dominant ACK bit, but later it transmit an active error flag 323, which would indicate it detected a CRC error, meaning it is not valid. In this example, at this time the third CAN node 120 does not detect a CRC error, but will detect a stuff error as implicit consequence of the second CAN node 110 transmitting an active error flag. As a result, the third CAN node 120 will detect an invalid frame (even though the third CAN node 120 does not know that the frame was destroyed by the second CAN node no) and will thus destroy the frame accordingly as indicated with 324. The resulting error in signal 210a or 210b is indicated with 325.

As is understood, numerous use cases may be envisaged. In the following, a brief list of use cases is discussed.
  a. At least one CAN node is unexpectedly transmitting a CAN frame and it needs to be determined which CAN node is transmitting the frame. The CAN frame identifier is not included in a CAN database and therefore that database cannot conclude which CAN node it is.
  b. At least one CAN node is unexpectedly causing CAN error flag which is then correctly echoed by other CAN nodes. The error flag is an indication of communication error and causes a failed frame transmission where the frame does not reach intended CAN nodes. The error flag is never included in a CAN database and therefore a CAN database cannot conclude which CAN node is responsible. It needs to be determined which CAN node is transmitting the error flag.
  c. A CAN node is unexpectedly not transmitting frames, however it may transmit ACK as confirmation of other CAN nodes transmitting frames. However, all CAN nodes are expected to transmit ACK at the same bit time and therefore it cannot be determined if this particular CAN node is transmitting an ACK. It thus needs to be determined if this CAN node is transmitting an ACK.

d. At least one CAN node is attempting to transmit a frame but there is a fault in the frame transmission and the CAN identifier cannot be identified. It needs to be determined which CAN node is transmitting the frame.

e. At least one CAN node is transmitting a frame in a format (normal frame, extended frame, remote frame, flexible data frame) in a format that was not the expected frame format. It needs to be determined which CAN node is transmitting this frame.

f. A CAN node is disturbing the bus which causes frame transmission failure. It needs to be determined which CAN node is disturbing the bus.

g. A CAN node is waking up the CAN network by means of basic wakeup, wakeup pattern (WUP) or by means of a wakeup frame (WUF) and it needs to be determined which CAN node is waking up the network.

h. A CAN node is waking up the CAN network by transmitting dominant and recessive bits in a way that is not strictly compliant to a CAN frame, a wakeup pattern or wakeup frame. It needs to be determined which CAN node is waking up the network.

Figure 12:
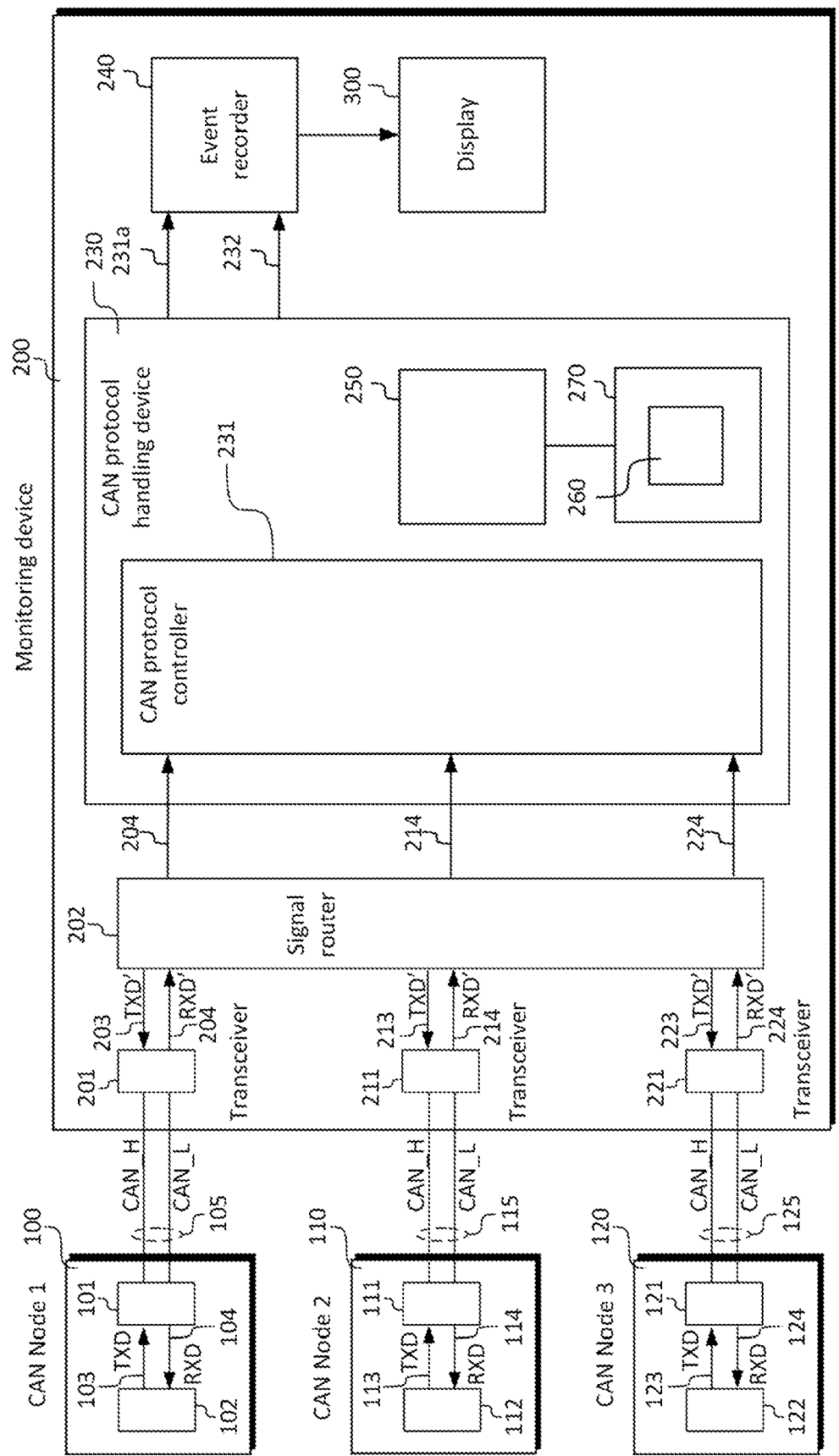
FIG. 12 shows a monitoring device according to a further embodiment.

FIG. 12 shows a monitoring device 200 according to an embodiment comprising the signal router 202 and the CAN protocol controller 231 previously discussed. However, in this embodiment, the monitoring device 200 further comprises a memory 240 where all or a selected part of the events occurring can be stored and analysed. For instance, event statistics may be provided to an operator. Further, individual signals e.g. carried over paths 204, 214, 224, 210a, or 210b, may be stored for analysis by an operator or a computer.

Further, the monitoring device 200 may be provided with a display 300 where any signal or detected event in the monitoring device 200 may be displayed. In this example, the CAN frames over path 231a and events over path(s) 232 are provided for display to an operator of the monitoring device 200.

Further, the monitoring device 200 comprises one or more processing units 250 in which the functionality of the monitoring device 200 may be implemented. Typically, all functionality of the monitoring device 200 (except for the display 300) may be carried out by the such processing unit(s) 250, such as that of the transceivers 201, 211, 221, the signal router 202, the CAN protocol controller 231, etc.

The steps of the method of the monitoring device 200 for monitoring a plurality of CAN buses according to embodiments may thus in practice be performed by the processing unit 250 embodied in the form of one or more microprocessors arranged to execute a computer program 260 downloaded to a suitable storage medium 270 associated with the microprocessor, such as a Random Access Memory (RAM), a Flash memory or a hard disk drive. The processing unit 250 is arranged to cause the monitoring device 200 to carry out the method according to embodiments when the appropriate computer program 260 comprising computer-executable instructions is downloaded to the storage medium 270, being e.g. a non-transitory storage medium, and executed by the processing unit 250. The storage medium 252 may also be a computer program product comprising the computer program 260. Alternatively, the computer program 260 may be transferred to the storage medium 270 by means of a suitable computer program product, such as a Digital Versatile Disc (DVD) or a memory stick. As a further alternative, the computer program 260 may be downloaded to the storage medium 270 over a network. The processing unit 250 may alternatively be embodied in the form of a digital signal processor (DSP), an application specific integrated circuit (ASIC), a field-programmable gate array (FPGA), a complex programmable logic device (CPLD), etc.

In one embodiment, the CAN transceivers of 201, 211, 221, are Integrated Circuit (IC) packaged devices with a bus driver and a bus comparator in the same IC package. In another embodiment the transceivers may be constructed by a plurality of passive components and by linear or digital semiconductor components.

In an embodiment, the CAN transceivers of 201, 211, 221 can have at least two configurations of the bus driver output voltage and bus comparator input thresholds, where one selected configurations of a plurality of configuration is in operation. For example, one configuration can be according to FIG. 2, and another configuration can be according to right side of FIG. 5. There is provided a configuration selection input, in one example in the form of digital selection input pin, in another example there is a serial peripheral interface (SPI) bus.

In one embodiment at least two CAN buses of 105, 115, 125, and at least two transceivers of 201, 211, 221, and the signal router 202 is part of a CAN bus repeater or CAN bus extender.

In a further embodiment two of CAN buses 105, 115, 125 and two of transceivers 201, 211, 221 are used with a simplified signal router 202. The signal router does not need to have encoder 206, 216, 226. Encoder 205 is an encoder with two inputs, one being RXD' output 204 of a first transceiver and one being RXD' output 214 of a second transceiver. The signal routing is simplified compared to FIG. 7; RXD' output 204 of a first transceiver is directly connected to a TXD' input 213 of a second transceiver, and connected directly to a CAN protocol handling device 230. RXD' output 214 of a second transceiver is directly connected to a TXD' 203 of a first transceiver, and connected directly to a CAN protocol handling device 230.

In a further embodiment at least CAN buses 105, 115, 125, and at least transceivers of 201, 211, 221, and the signal router 202 is part of a CAN active star coupler.

In a further embodiment some or all parts of monitoring device 200 is part of a digital storage oscilloscope with serial bus protocol decoding.

An approach in CAN analysis is to passively and non-intrusively monitor the CAN nodes. This may require extended monitoring time in order to gather sufficient data about the CAN nodes. However, time available for monitoring may be limited and not enough in some scenarios. In a system of CAN nodes, there may be additional conditions caused by other nodes of the system, which affect node operation. Those conditions may not necessarily occur if performing a standalone CAN node test during e.g. CAN conformance verification. Therefore, in an embodiment, an approach is to actively generate and transmit signals over the CAN bus causing a desired result, and to monitor any CAN nodes in operation, e.g. error conditions of the CAN nodes.

CAN nodes receiving the exact same bit-stream of CAN data frames handle errors in the data link layer at the same time (i.e. by detecting the error simultaneously for a given bit in the stream and as a response transmit error flag at a next bit in the stream).

Conversely, CAN nodes not receiving the exact same bit-stream of CAN data frames may handle errors in the data link layer at different times. This may happen in e.g. harsh electrical environments such as e.g. motor vehicles, or because of a compromised bus topology, due to CAN bus signal integrity problems. Hence, a certain CAN ECU may or may not be the first CAN node to detect an error, e.g. a stuff error and transmit an error flag (which generally is not a deterministic event). The fault confinement mechanism in ISO-11898:1 resulting in transmission of active error flag is an example of redundant error handling, where CAN nodes contribute to asserting invalidation of a frame perceived as not valid by at least one CAN node.

To evaluate a specific CAN node data link layer operation while detecting errors in a CAN system, two main scenarios are of interest:
 i. the specific CAN node is the first node to detect a data link error and transmit error flag (EF) to other CAN nodes. Other CAN nodes detect a stuff error caused by the error flag from the specific node and transmit error flag as well, and
 ii. at least one other CAN node is the first CAN node to detect a data link error and transmit error flag (EF) to the specific CAN node which in turn transmits an error flag. The specific CAN node thus detects a stuff error caused by the error flag from the other node.

CAN nodes that do not receive the exact same application signals in a data field of a CAN data frame may handle manipulated signals in different ways or at different instants of time of associated bits in the stream.

To evaluate a specific CAN node application layer operation while receiving manipulated signals in a CAN system, two main scenarios are of interest:
 i. the specific CAN node is the only node to receive a manipulated signal in a data field, while other CAN nodes receive non-manipulated signals, and
 ii. all CAN nodes receive a manipulated signal in a data field.

Figure 13:
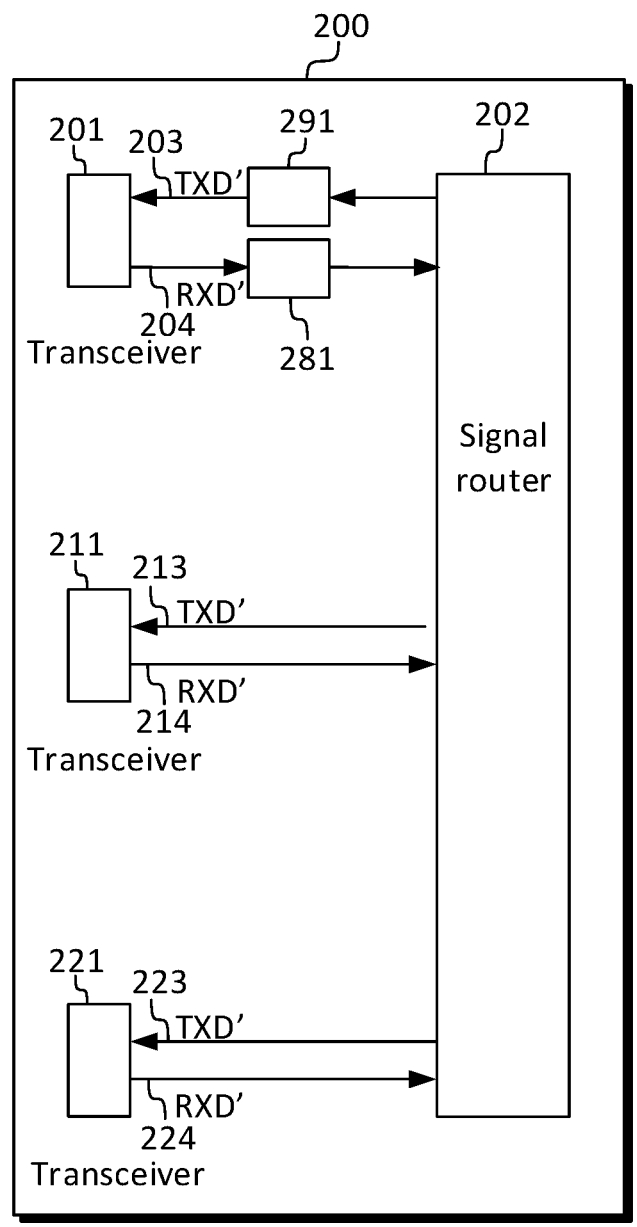
FIG. 13 illustrates a monitoring device according to another embodiment.

FIG. 13 illustrates a monitoring device 200 according to an embodiment comprising a first bit-stream manipulation module 281 connected in the RXD' path 204 and a second bit-stream manipulation module 291 connected in the TXD' path 203 between a transceiver 201 and a signal router 202. The modules 281, 291 are controlled to handle bit manipulation of CAN data frame/remote frame to and from one or more CAN nodes 100, 110, 120 (not shown in FIG. 13).

The first bit-stream manipulation module 281 may optionally be controlled to modify bits in a received CAN data frame from the CAN transceiver 201 and the first CAN node 100 before passing the frame to the signal router 202. The activation or deactivation of manipulation may be based on a CAN frame identifier in an arbitration field, i.e. a certain bit position in a CAN data frame/remote frame. The manipulation may introduce a data link error, e.g. a stuff error, a CRC error, a format error, etc. This manipulation will cause the second and third CAN nodes 110, 120 to receive manipulated CAN frames, and the second and third CAN nodes 110, 120 are expected to detect error and as a response transmit error flag to the first CAN node 100. The first bit-stream manipulation module 281 may be equipped with a manipulation configuration memory, and/or a software executable instruction or similar.

The second bit-stream manipulation module 291 may optionally be controlled to modify bits in a received CAN data frame from the signal router 202 before passing the frame to the CAN transceiver 201 and the first CAN node 100. The manipulation can be based on detecting a specific value of a received identifier in an arbitration field, i.e. a certain bit position in a CAN data frame/remote frame. The manipulation may introduce e.g. a stuff error, a CRC error, a format error, etc. This manipulation will cause the first CAN node 100 to receive manipulated CAN frames, and the first CAN node 100 is expected to detect errors and as a response transmit error flag to the second and third CAN nodes 110, 120.

CAN data frames/remote frames contain a cyclic redundancy checksum so that a receiver of the frames can validate the received frame as having no data link layer errors and therefore being correctly received (or alternatively having errors). For instance, in the CBFF format there is a 15 bit CRC. This results in a certain degree of tolerance to some minor modification of the bit-stream (including e.g. data field) for which the CRC is calculated, where the resulting modified data field will result in an identical CRC as before the modification. However, this is in most situations unlikely. A majority of possible modifications of only a data field of a CAN data frame will have as a consequence that such frame will be rendered invalid (and cause a CRC error), unless the CRC is properly modified as well.

The first bit-stream manipulation module 281 may optionally be controlled to modify bits in a data field and a CRC field of a received CAN data frame from the CAN transceiver 201 and the first CAN node 100 before passing the manipulated CAN frame to the signal router 202. If the data field is modified, then it is likely that in order for the frame to still be rendered valid and considered as having no CRC error by receiving CAN node 110, 120, the CRC need to be recalculated and the CRC field modified as well. No errors are induced on data link layer. The manipulation can be based on detecting a specific value of a received identifier in an arbitration field, receiving a specific signal value in a data field, or a certain bit position in a CAN data frame. The manipulation can be based on a CAN database where position and size of a signal in a CAN data field is defined. The first module 281 may recalculate a new correct CRC based on the resulting manipulated content of data field, as well as other preceding frame fields that are used for CRC calculation and replace the CRC field.

It is noted that the first bit-stream manipulation module 281 may be implemented using a full CAN protocol controller in order to decode received frames and encode new or modified frames passed on to the signal router 202.

The second bit-stream manipulation module 291 may optionally be controlled to modify bits in a data field and a CRC field of a received CAN data frame from the signal router 202 before passing the manipulated CAN frame to the CAN transceiver 201 and the first CAN node 100. If data field is modified, then it is likely that in order for the frame to still be rendered valid and considered as having no CRC error by the receiving first CAN node 100, the CRC need to be recalculated and CRC field modified as well. No errors are induced on data link layer. The manipulation can be based on detecting a specific value of a received identifier in an arbitration field, receiving a specific signal value in a data field, or a certain bit position in a CAN data frame. The manipulation can be based on a CAN database where position and size of a signal in a CAN data field is defined. The second module 291 may recalculate a new correct CRC based on the resulting manipulated content of data field, as well as other preceding frame fields that are used for CRC calculation and replace the CRC field.

It is noted that the second bit-stream manipulation module 291 may be implemented using a full CAN protocol controller in order to decode received frames and encode new or modified frames passed on to the CAN transceiver 201.

Further, only first and second bit-stream manipulation modules 281, 291 are shown in FIG. 13. However, the monitoring device 200 may also comprise corresponding bit-stream manipulation modules between transceivers 211, 221 and the signal router 202, respectively similar to 281, 291 also between CAN transceivers 211,221 and signal router 202. While the bit-stream manipulation modules 281, 291 modify the bit-stream, the CAN nodes 100, 110, 120 can be monitored by the CAN protocol handling device 230 as described previously.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims. Example of other embodiments are other differential bus systems than CAN, where at least two bus states exist and using transceivers with other transmitted bus voltage levels and receiving thresholds, and other data link layer protocols and other protocol specific events.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of a monitoring device of monitoring a plurality of Controller Area Network (CAN) buses, wherein at least one CAN node is connected to each CAN bus, said plurality of CAN buses being interconnected via the monitoring device, the method comprising:
    detecting, for each CAN bus, any dominant data being sent over said each CAN bus by a CAN node connected to said each CAN bus; and
    routing said any dominant data received by the monitoring device over said each CAN bus to all remaining CAN buses without overwriting any dominant data sent over the remaining CAN buses, the CAN nodes being configured to output dominant data over the CAN buses at a voltage level which is in a range complying with a required transmit voltage range for dominant data stipulated by CAN standard, while the monitoring device is configured to output dominant data over the CAN buses at a voltage level at least exceeding a minimum receive level for dominant data stipulated by the CAN standard but being below the lowest voltage level of the range with which the CAN nodes are configured to output dominant data, and configured to receive dominant data at a voltage level at least being in the range with which the CAN nodes are configured to output dominant data, wherein the detecting of any dominant data sent over said each CAN bus by a CAN node comprises:
    detecting whether a voltage level of data being sent over said each CAN bus is within said range, in which case a CAN node is detected to send dominant data over said each CAN bus; wherein the routing of data received by the monitoring device over said each CAN bus to all remaining CAN buses comprises:
    routing the dominant data at a voltage level at least exceeding the minimum receive level stipulated for dominant data by the CAN standard but being below the voltage level with which the CAN nodes are configured to output dominant data.

2. The method of claim 1, further comprising:
    routing, if no dominant data is detected to have been sent by a CAN node connected to said each CAN bus and the monitoring device is not sending dominant data, recessive data at a voltage level complying with a required receiver voltage range for recessive data as stipulated by the CAN standard.

3. The method of claim 2, further comprising, before routing the data to the CAN nodes:
    encoding, for each CAN bus, the data received over the remaining CAN buses such that an output of the encoding represents dominant data if any one or more of inputs to the encoding represents dominant data and represents recessive data if all inputs to the encoding represents recessive data.

4. The method of claim 3, further comprising:
    encoding the data received over the CAN buses such that an output of the encoding represents dominant data if any one or more of inputs to the encoding represents dominant data and represents recessive data if all inputs to the encoding represents recessive data.

5. The method of claim 4, further comprising:
    encoding, the data received over the CAN buses into one or more CAN protocol symbols;
    identifying, from the data representing the data sent over the CAN buses, to which one or more of the CAN nodes the data being encoded into one or more CAN protocol symbols belongs.

6. The method of claim 5, wherein the identifying of the one or more of the CAN nodes to which the data representing the data sent over the CAN buses belongs comprises:
    detecting a start-of-frame, SOF, bit in the data representing the data sent over the CAN buses indicating a start of a CAN frame in which the data is to be encoded.

7. The method of claim 3, further comprising:
    detecting, from the data representing the data sent over the CAN buses, one or more CAN events and one or more CAN nodes for which the event occurs.

8. The method of claim 1, further comprising:
    displaying any data monitored in the monitoring device.

9. The method of claim 1, further comprising:
    manipulating data sent over at least one of the CAN buses to cause a desired result on the remaining CAN buses and/or manipulating data received over at least one of the CAN buses.

10. A monitoring device configured to monitor a plurality of Controller Area Network (CAN) buses, wherein at least one CAN node is connected to each CAN bus, said plurality of CAN buses being interconnected via the monitoring device, which monitoring device comprises a processing unit and a memory, said memory containing instructions executable by said processing unit, whereby the monitoring device is operative to:
    detect, for each CAN bus, any dominant data being sent over said each CAN bus by a CAN node connected to said each CAN bus; and
    route said any dominant data received by the monitoring device over said each CAN bus to all remaining CAN buses without overwriting any dominant data sent over the remaining CAN buses, the CAN nodes being configured to output dominant data over the CAN buses at a voltage level which is in a range complying with a required transmit voltage range for dominant data stipulated by CAN standard, while the monitoring device is configured to output dominant data over the CAN buses at a voltage level at least exceeding a minimum receive level for dominant data stipulated by the CAN standard but being below the lowest voltage level of the range with which the CAN nodes are configured to output dominant data, and configured to receive dominant data at a voltage level at least being in the range with which the CAN nodes are configured to output dominant data, further being operative to, when the detecting of any dominant data sent over said each CAN bus by a CAN node:
- detect whether a voltage level of data being sent over said each CAN bus is within said range, in which case a CAN node is detected to send dominant data over said each CAN bus; and further being operative to, when routing data received by the monitoring device over said each CAN bus to all remaining CAN buses:
- route the dominant data at a voltage level at least exceeding the minimum receive level stipulated for dominant data by the CAN standard but being below the voltage level with which the CAN nodes are configured to output dominant data.

11. The monitoring device of claim 10, further being operative to:
- route, if no dominant data is detected to have been sent by a CAN node connected to said each CAN bus and the monitoring device is not sending dominant data, recessive data at a voltage level complying with a required receiver voltage range for recessive data as stipulated by the CAN standard.

12. The monitoring device of claim 10, further being operative to, before routing the data to the CAN nodes:
- encode, for each CAN bus, the data received over the remaining CAN buses such that an output of the encoding represents dominant data if any one or more of inputs to the encoding represents dominant data and represents recessive data if all inputs to the encoding represents recessive data.

13. The monitoring device of claim 12, further being operative to:
- encode the data received over the CAN buses such that an output of the encoding represents dominant data if any one or more of inputs to the encoding represents dominant data and represents recessive data if all inputs to the encoding represents recessive data.

14. The monitoring device of claim 13, further being operative to:
- encode, the data received over the CAN buses into one or more CAN protocol symbols;
- identify, from the data representing the data sent over the CAN buses, to which one or more of the CAN nodes the data being encoded into one or more CAN protocol symbols belongs.

15. The monitoring device of claim 14, further being operative to, when identifying the one or more of the CAN nodes to which the data representing the data sent over the CAN buses belongs:
- detect a start-of-frame, SOF, bit in the data representing the data sent over the CAN buses indicating a start of a CAN frame in which the data is to be encoded.

16. The monitoring device of claim 10, further being operative to:
- manipulate data sent over at least one of the CAN buses to cause a desired result on the remaining CAN buses and/or manipulate data received over at least one of the CAN buses.

17. A non-transitory computer-readable storage medium storing instructions that, when executed, cause a processing unit of a monitoring device to monitor a plurality of Controller Area Network (CAN) buses, wherein at least one CAN node is connected to each CAN bus, said plurality of CAN buses being interconnected via the monitoring device, wherein the instructions that cause the processing unit to monitor the plurality of can buses comprise instructions that cause the processing unit to:
- detect, for each CAN bus, any dominant data being sent over said each CAN bus by a CAN node connected to said each CAN bus; and
- route said any dominant data received by the monitoring device over said each CAN bus to all remaining CAN buses without overwriting any dominant data sent over the remaining CAN buses, the CAN nodes being configured to output dominant data over the CAN buses at a voltage level which is in a range complying with a required transmit voltage range for dominant data stipulated by CAN standard, while the monitoring device is configured to output dominant data over the CAN buses at a voltage level at least exceeding a minimum receive level for dominant data stipulated by the CAN standard but being below the lowest voltage level of the range with which the CAN nodes are configured to output dominant data, and configured to receive dominant data at a voltage level at least being in the range with which the CAN nodes are configured to output dominant data, wherein the instructions that cause the processing unit to detect any dominant data sent over said each CAN bus by a CAN node comprise instructions that cause the processing unit to:
- detect whether a voltage level of data being sent over said each CAN bus is within said range, in which case a CAN node is detected to send dominant data over said each CAN bus; and further being operative to, when routing data received by the monitoring device over said each CAN bus to all remaining CAN buses:
- route the dominant data at a voltage level at least exceeding the minimum receive level stipulated for dominant data by the CAN standard but being below the voltage level with which the CAN nodes are configured to output dominant data.

18. The non-transitory computer-readable storage medium of claim 17, further comprising instructions that cause the processing unit to:
- manipulate data sent over at least one of the CAN buses to cause a desired result on the remaining CAN buses and/or manipulate data received over at least one of the CAN buses.

* * * * *